United States Patent
Schneiders et al.

(10) Patent No.: US 11,673,130 B2
(45) Date of Patent: Jun. 13, 2023

(54) CATALYST SYSTEM CONTAINING A METATHESIS CATALYST AND AT LEAST ONE PHENOLIC COMPOUND AND A PROCESS FOR METATHESIS OF NITRILE-BUTADIENE RUBBER (NBR) USING THE CATALYST SYSTEM

(71) Applicant: ARLANXEO DEUTSCHLAND GMBH, Dormagen (DE)

(72) Inventors: Karola Schneiders, Bergisch Gladbach (DE); Karsten Knebel, Erkelenz (DE); Volker Wege, Neuss (DE); Jurgen Kirsch, Leverkusen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 17/299,985

(22) PCT Filed: Dec. 2, 2019

(86) PCT No.: PCT/EP2019/083341
§ 371 (c)(1),
(2) Date: Jun. 4, 2021

(87) PCT Pub. No.: WO2020/120207
PCT Pub. Date: Jun. 18, 2020

(65) Prior Publication Data
US 2022/0032279 A1    Feb. 3, 2022

(30) Foreign Application Priority Data

Dec. 12, 2018 (EP) .................... 18212017

(51) Int. Cl.
| | | |
|---|---|---|
| B01J 31/22 | (2006.01) | |
| B01J 31/02 | (2006.01) | |
| B01J 31/18 | (2006.01) | |
| B01J 31/24 | (2006.01) | |
| C08C 19/02 | (2006.01) | |
| C08C 19/08 | (2006.01) | |
| C08C 19/00 | (2006.01) | |

(52) U.S. Cl.
CPC ....... B01J 31/2278 (2013.01); B01J 31/0202 (2013.01); B01J 31/181 (2013.01); B01J 31/2226 (2013.01); B01J 31/2404 (2013.01); C08C 19/02 (2013.01); C08C 19/08 (2013.01); B01J 2231/54 (2013.01); B01J 2531/821 (2013.01); C08C 2019/09 (2013.01)

(58) Field of Classification Search
CPC .. B01J 31/2278; B01J 31/0202; B01J 31/181; B01J 31/2226; B01J 31/2404; B01J 2231/54; B01J 2531/821; B01J 2540/40; B01J 2231/543; B01J 2540/62; B01J 31/1805; B01J 31/2273; B01J 31/2208; C08C 19/02; C08C 19/08; C08C 2019/09
See application file for complete search history.

(56) References Cited

U.S. PATENT DOCUMENTS

| | | |
|---|---|---|
| 3,700,637 A | 10/1972 | Finch et al. |
| 4,464,515 A | 8/1984 | Rempel et al. |
| 4,503,196 A | 3/1985 | Rempel et al. |
| 4,631,315 A | 12/1986 | Buding et al. |
| 4,746,707 A | 5/1988 | Fiedler et al. |
| 4,795,788 A | 1/1989 | Himmler et al. |
| 4,978,771 A | 12/1990 | Fiedler et al. |
| 6,494,913 B1 | 12/2002 | Huebner et al. |
| 6,683,136 B2 | 1/2004 | Guo et al. |
| 9,150,468 B2 * | 10/2015 | Schertzer ............ C07C 6/04 |
| 2002/0107138 A1 | 8/2002 | Hoveyda et al. |
| 2004/0127647 A1 | 7/2004 | Ong et al. |
| 2004/0132891 A1 | 7/2004 | Ong et al. |
| 2004/0143335 A1 | 7/2004 | Dews et al. |
| 2005/0107882 A1 | 5/2005 | Stone et al. |
| 2006/0211905 A1 * | 9/2006 | Forman ............... C07C 6/04 585/16 |
| 2009/0192621 A1 | 7/2009 | Winslow et al. |
| 2010/0087600 A1 * | 4/2010 | Muller ............ B01J 31/2273 525/245 |
| 2013/0345366 A1 | 12/2013 | Obrecht et al. |
| 2016/0376422 A1 * | 12/2016 | Obrecht ............... C08K 5/13 524/347 |

FOREIGN PATENT DOCUMENTS

| | | |
|---|---|---|
| CN | 103080137 A | 5/2013 |
| DE | 2539132 A1 | 3/1977 |
| DE | 3433392 A1 | 3/1986 |
| DE | 3529252 A1 | 2/1987 |

(Continued)

OTHER PUBLICATIONS

International Search Report for corresponding application PCT/EP2019/0083341 dated Jul. 9, 2020.
Written Opinion for corresponding application PCT/EP2019/0083341 dated Jul. 9, 2020.
J. M. Blacquiere: "New Directions in Catalyst Design and Interrogation: Applications in Dinitrogen Activation and Olefin Metathesis", Dissertation (PhD Thesis) University of Ottawa, Jan. 1, 2011, pp. 1-276.
J. Julis, et al: "Selective ethenolysis and oestrogenicity of compounds from cashew nut shell liquid", Green Chemistry, vol. 16, No. 5, Jan. 1, 2014 (Jan. 1, 2014), pp. 2846-2856.
X. Bantreil, et al: "Synthesis of N-heterocyclic carbene ligands and derived ruthenium olefin metathesis catalysts", Nature Protocols, vol. 6, No. 1, Dec. 16, 2010, pp. 69-77.

(Continued)

Primary Examiner — Robert C Boyle
(74) Attorney, Agent, or Firm — Norris McLaughlin PA

(57) ABSTRACT

The present invention relates to a catalyst system containing a metathesis catalyst containing at least one N-heterocyclic carbene ligand and at least one phenolic compound and to a process for performing the metathesis on nitrile rubbers for reducing their molecular weight using a metathesis catalyst containing at least one N-heterocyclic carbene ligand (NHC ligand) and at least one phenolic compound.

16 Claims, No Drawings

(56) References Cited

FOREIGN PATENT DOCUMENTS

| | | | |
|---|---|---|---|
| DE | 3540918 | A1 | 5/1987 |
| DE | 3541689 | A1 | 5/1987 |
| EP | 0134023 | A1 | 3/1985 |
| EP | 0298386 | A2 | 1/1989 |
| EP | 0471250 | A1 | 2/1992 |
| EP | 2027920 | A1 | 2/2009 |
| EP | 2145681 | A1 | 1/2010 |
| EP | 2289623 | A1 | 3/2011 |
| EP | 2484700 | A1 | 8/2012 |
| GB | 1558491 | A1 | 1/1980 |
| WO | 9604289 | A1 | 2/1996 |
| WO | 9706185 | A1 | 2/1997 |
| WO | 0071554 | A2 | 11/2000 |
| WO | 02100905 | A1 | 12/2002 |
| WO | 02100941 | A1 | 12/2002 |
| WO | 03002613 | A1 | 1/2003 |
| WO | 2004035596 | A1 | 4/2004 |
| WO | 2004056728 | A1 | 7/2004 |

OTHER PUBLICATIONS

International Preliminary Report on Patentability for corresponding application PCT/EP2019/083341 dated Jun. 24, 2021.
Hoffmann, et al.: "Vulcanizate structure, relaxation, and tensile stregnth of polyisoprenes", translated for Rubber Chem & Technology, vol. 36, pp. 815-834, 1963.
Szadkowska, et. al. : "Enhancement of ruthenium-catalyzed olefin metathesis reactions: searching for new catalyst or new reaction?", Pure Appl. Chem, vol. 83, No. 3, pp. 553-563, 2011.
Vedrenne, et al. : "Dramatic Effect of Boron-Based Lewis Acids in Cross-Metathesis Reactions", Synlett 2005, No. 4, pp. 670-672.
Ghosh, et al. : "Ring-closing metathesis strategy to unsaturated y- and s-lactones: synthesis of hydroxyethylene Isostere for Proteease inhibitors", Tetrahedron Letters, vol. 39, pp. 4651-4654, 1998.
Katayama, et al.: "Ring-opening metathesis polymerization of norbornene catalyzed by a [Hydridotris(pyrazolyl)borato]vinylideneruthneenium complex", Journal of Organometalic Chemistry, 562, pp. 203-206, 1998.
Yang, et al.: "Lewis acid assisted ring-closing metathesis of chiral diallylamines: an efficient approach to enantiopure pyrrolidine derivatives", Organic Letters, vol. 7, No. 5, pp. 871-874, 2005.
Bai, et al.: "Lewis-acid assisted cross metathesis of acrylonitrile with functionalized olefins catalyzed by phosphine-free ruthenium carbene complex", Organic Biomol Chem, vol. 3, pp. 4139-4142, 2005.
Bujok, et al.: "Ortho- and para-substituted hoveyda-grubbs carbenes. An improved synthesis of highly efficient metathesis initiators", Journal of Oganic Chemistry, vol. 69, pp. 6894-6896, 2004.
Grela, et al.: "A good bargain: an inexpensive, air-stable ruthenium metathesis catalyst derived from a-asarone", Eur. Journal of Organic Chemistry, pp. 963-966, 2003.
Furstner, et al.: "Total synthesis of (t)-ricinelaidic acid lactone and of (-)-gloeosporone based on transition-metal-catalyzed c—c bond formations", Journal of American Chemistry Soc., vol. 119, pp. 9130-9136, 1997.
Grela, et al.: "A highly efficient ruthenium catalyst for metathesis reactions", Agnew. Chem. Int. Ed., vol. 41, No. 21, pp. 4038-4040, 2002.
Schrock, et al.: "Molybdenum and tungsten Imido alkylidene complexes as efficient olefin-metathesis catalysts", Agnew. Chem. Int. Ed., vol. 42, pp. 4592-4633, 2003.
Krause, et al.: "Synthesis and reactivity of homogeneous and heterogeneous ruthenium-based metathesis catalysts containing electron-withdrawing ligands", Eur. Journal of Organic Chemistry, vol. 10, pp. 777-784, 2004.
EP Search Report for corresponding application EP 22172198.8 dated Nov. 23, 2022.

\* cited by examiner

CATALYST SYSTEM CONTAINING A METATHESIS CATALYST AND AT LEAST ONE PHENOLIC COMPOUND AND A PROCESS FOR METATHESIS OF NITRILE-BUTADIENE RUBBER (NBR) USING THE CATALYST SYSTEM

This is an application filed under 35 USC 371 based on PCT/EP2019/083341, filed 2 Dec. 2019, which in turn claims priority to EP 18212017.0, filed 12 Dec. 2018. The applicant makes all claims to priority to the foregoing. The applicant herein incorporates by reference the entirety of the foregoing applications herein.

The present invention relates to a catalyst system containing a metathesis catalyst containing at least one N-heterocyclic carbene ligand and at least one phenolic compound and to a process for performing the metathesis on nitrile rubbers for reducing their molecular weight using a metathesis catalyst containing at least one N-heterocyclic carbene ligand (NHC ligand) and at least one phenolic compound.

Nitril-butadiene rubbers (NBR) are copolymers constructed from two or more monomer units of which at least one is an α,β-unsaturated nitrile and one is a conjugated diene.

Hydrogenation makes it possible to convert NBR into hydrogenated nitrile-butadiene rubber (HNBR) in which the double bonds of the butadiene units are completely or partially saturated with hydrogen. The degree of hydrogenation of the HNBR is typically in the range from 50% to 100%. The average mass-weighted molecular weights (Mw) are typically between 150 000 and 500 000 g/mol at a polydispersity index (PDI) between 2 and 5.

HNBR is typically employed as a specialty rubber in a very wide variety of fields, in particular in the automotive industry (belts, seals, hoses, tensioners), in oil extraction (well seals, valve seals) but also in airplane construction and boatbuilding, in electronics (binders in electrodes and batteries) and in mechanical engineering.

The application profile of HNBR is based on its exceptional mechanical properties such as high abrasion resistance in conjunction with very good heat resistance and resistance to contact media such as ozone, chemicals and oil.

The processability of HNBR is often impaired by its high Mooney viscosity which for non-pretreated HNBR types is in the range from 55 to 130 (ML1+4 at 100° C.). For many applications an HNBR grade having a lower molecular weight and thus a lower Mooney viscosity would be desirable.

However, this is not possible since the required NBR types having a lower molecular weight/a lower Mooney viscosity cannot be obtained as a consequence of production considerations.

Presently a reduction of the Mooney viscosity to values of less than 55 (ML 1+4, 100° C.) is technically realizable in two ways.

Mastication for example comprises subjecting HNBR to strong shear forces in a roller mill or in an extruder, thus shortening the chains.

Metathesis comprises reacting the NBR with a metathesis catalyst in situ prior to hydrogenation, usually with addition of a low molecular weight α-olefin.

Metathesis catalysts are known inter alia from WO-A-96/04289 and WO-A-97/06185. They have the following general formula:

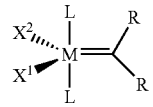

wherein M represents osmium or ruthenium, R represents the same or different organic radicals having a large structural range of variation, $X^1$ and $X^2$ represent anionic ligands and L represents neutral electron donors. In the literature for such metathesis catalysts the commonly used term "anionic ligands" is always to be understood as meaning ligands which, when regarded as removed from the metal center, are negatively charged when they have a closed electron shell.

The degradation in molecular weight is achieved by metathesis which typically comprises adding low molecular weight 1-olefins. The metathesis of nitrile rubber is described for example in WO-A-02/100905, WO-A-02/100941 and WO-A-03/002613. The metathesis reaction is advantageously performed in the same solvent as the hydrogenation reaction in order that after termination of the degradation reaction the degraded nitrile rubber need not be isolated from the solvent before it is subjected to the subsequent hydrogenation. Catalysis of the metathetic degradation reaction is carried out using metathesis catalysts that are tolerant of polar groups, in particular of nitrile groups.

WO-A-02/100905 and WO-A-02/100941 describe a process comprising the degradation of nitrile rubber starting polymers by olefin metathesis and subsequent hydrogenation to HNBR having a low Mooney viscosity. A nitrile rubber is reacted in the presence of a co-olefin and special osmium- or ruthenium-based metathesis catalysts in a first step and hydrogenated in a second step. Obtainable in this way are hydrogenated nitrile rubbers having a weight-average molecular weight (Mw) of less than 250,000, a Mooney viscosity (ML 1+4 at 100° C.) of less than 50 and a polydispersity index PDI of less than 2.5.

Metathesis of nitrile rubber may be carried out using for example the catalyst bis(tricyclohexylphosphine)benzylideneruthenium dichloride, as shown below.

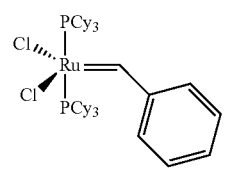

Grubbs I catalyst

After metathesis and hydrogenation the nitrile rubbers have a lower molecular weight and a narrower molecular weight distribution than the hydrogenated nitrile rubbers produced without the abovementioned metathesis.

However, the amounts of Grubbs I catalyst used for performing the metathesis are large. In the experiments in WO-A-03/002613 they constitute for example 307 ppm and 61 ppm of Ru based on the employed nitrile rubber. Furthermore the necessary reaction times are long and the molecular weights after degradation are still relatively high (see example 3 of WO-A-03/002613 where Mw=180 000 g/mol and Mn=71 000 g/mol).

US-A-2004/0127647 describes blends based on low molecular weight HNBR rubbers having a bimodal or multimodal molecular weight distribution and vulcanizates of these rubbers. According to the examples 0.5 phr of Grubbs I catalysts is used for performing the metathesis. This corresponds to an amount of 614 ppm of ruthenium based on the employed nitrile rubber. WO-A-00/071554 further discloses a group of catalysts known in the art as "Grubbs II catalysts".

When such a "Grubbs II catalyst", such as for example the catalyst benzylidene[1,3-bis(2,4,6-trimethylphenyl)-2-imidazolidinylidene]dichloro(tricyclohexylphosphine)ruthenium (or 1,3-bis(2,4,6-trimethylphenyl)-2-imidazolidenylidene(tricyclohexylphosphine)ruthenium (phenylmethylene) dichloride) shown hereinbelow, is employed for the NBR metathesis (US-A-2004/0132891), said reaction is successful even without the use of a co-olefin.

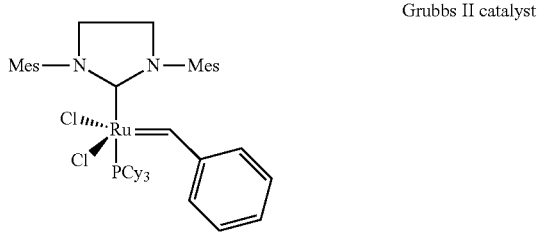

Grubbs II catalyst

After the subsequent hydrogenation which is preferably performed in the same solvent, hydrogenated nitrile rubber has lower molecular weight and a narrower molecular weight distribution (PDI) than when using identical amounts of Grubbs I catalysts. In terms of molecular weight and molecular weight distribution the metathesis degradation thus proceeds more efficiently with catalysts of the Grubbs II type than with catalysts of the Grubbs I type. However the amounts of ruthenium required for this efficient metathetic degradation are still relatively high. In addition, performing the metathesis with the Grubbs II catalyst still requires long reaction times.

All of the abovementioned processes for metathetic degradation of nitrile rubber have in common that relatively large amounts of catalyst must be employed and long reaction times are required to produce the desired low molecular weight nitrile rubbers by metathesis.

In other types of metathesis reactions too the activity of the employed catalysts and possible reaction accelerators have a decisive influence.

J. Am. Chem. Soc. 1997, 119, 9130-9136 describes that addition of the Lewis acid tetraisopropoxytitanate improves the activity of the Grubbs I catalyst in the ring closing metathesis of 1,ω-dienes, thus achieving an improvement in yield. In the cyclization of the 9-decenoic ester of 4-pentenoate the yield of the macrolid achieved is greater upon addition of tetraisoproproxytitanate than upon addition of the salt LiBr. There is no indication of the extent to which this effect is also transferable to other types of metathesis reactions or other metathesis catalysts.

Tetrahedon Lett. 1998, 39, 4651-4654 describes the ring closing metathesis (RCM) of acrylates to afford α,β-unsaturated δ- and γ-lactones using 10 to 15 mol % of the Grubbs I catalyst. It is shown that addition of 0.3 to 3 equivalents of tetraisopropoxytitanate has a positive effect both on yield and on reaction time. Transferral to other metathesis types or substrates is not mentioned.

Org. Biomol. Chem. 2005, 3, 4139-4142 investigates the cross metathesis (CM) of acrylonitrile with itself and with other functionalized olefins using [1,3-bis(2,6-dimethylphenyl)-4,5-dihydroimidazol-2-ylidene] $(C_5H_5N)_2(Cl)_2$ Ru=CHPh. The yield of the respective product is improved by addition of tetraisopropoxytitanate. This publication gives the impression that the activity-enhancing effect of tetraisopropoxytitanate occurs only when using a specific catalyst with pyridine ligands. There are no pointers to the influence of tetraisopropoxytitanate when using pyridine-free catalysts or in other types of metathesis reactions.

By contrast, Synlett 2005, No. 4, 670-672 discloses that in the cross metathesis of allyl carbamate with methyl acrylate the addition of tetraisopropoxytitanate has a negative influence on product yield when the catalyst used is the Hoveyda catalyst. Thus addition of tetraisopropoxy titanate reduces the product yield from 28% to 0%. Addition of dimethyl aluminum chloride also reduces the yield from 28% to 20%.

Synlett 2005, No. 4, 670-672 further describes that the product yield of the cross metathesis of low molecular weight olefins is improved when using specific boric acid derivatives. Chlorocatecholborane ($ArO_2BCl$), dichlorophenylborane ($PhBCl_2$) and chlorodicyclohexylborane ($Cy_2BCl$) are employed. The yield increases to greatly varying extents depending on the boric acid derivative. To obtain corresponding yield improvements an addition of 10 to 20 mol % of the boric acid derivative based on 1 equivalent of an olefin is required.

Org. Lett. 2005, 7, 871-874 likewise describes the successful use of tetraisopropoxytitanate as an addition to a ring closing metathesis (RCM) with the Grubbs II catalyst. For reaction optimization of the RCM of diallylamines even substoichiometric amounts of the Lewis acid based on the catalyst have proven sufficient to obtain high yields of the desired pyrrolidine derivatives.

The method of adding tetraisopropoxy titanate is already sufficiently well-established that it is also successfully used in natural products synthesis. This is described in Tetrahedron Letters 2012, 53, 1287.

The use of various Lewis and Brönstedt acids but also of Cu(I)C as co-catalysts is also described in Organometallics, 1998, 17, 5384-5389. Saturated [tris(pyrazolyl)borato]alkylideneruthenium complexes are used in the RCM of diethyl malonate. The co-catalysts are employed to generate a free coordination site in the saturated system by abstraction of a ligand. HCl, $AlCl_3$ and CuCl in particular proved to be effective additions.

J. Orgenomet. Chem. 1998, 562, 203-206 describes the addition and the activity-enhancing effect of the Lewis acid boron trifluoride etherate in the ring opening metathesis polymerization (ROMP) of norbornene with a [hydridotris (pyrazolyl)borato]vinylideneruthenium complex.

Pure Appl. Chem 2011, 83, 553-563 describes the use of 25 mol % of triphenyl borate as an addition to the CM of 3-nitropropene to afford allylic nitro compounds using 5 mol % of the Grela (II) catalyst. While higher catalyst loadings and higher reaction temperatures did not enhance yield during reaction optimization, the addition of triphenyl borate made it possible to obtain a broad palette of nitro compounds in good yield.

WO-A-2004/056728 discloses a process for performing a metathesis reaction, wherein at least two low molecular weight olefins are reacted in the presence of a Grubbs I metathesis catalyst and a phenolic compound in the form of phenol or substituted phenol.

By contrast, the addition of phenol to the metathesis reaction of 1-octene with Grubbs II catalyst results in a deterioration in metathesis efficiency. The metathesis of polymers such as for example nitrile rubber for molecular weight reduction is not disclosed.

Despite the existing prior art there remains a need for improved catalyst systems for metathesis reactions and in particular for molecular weight degradation of nitrile rubber by metathesis. This applies all the more against the backdrop that a simple transferability of results from one metathesis reaction to another is not readily apparent from the available prior art.

The metathesis reaction of NBR presently shows considerable variations in the reproducibility of the observed molecular weight degradation and requires high catalyst loadings. This observation appears to be independent of the catalyst employed for the metathesis. An efficient metathesis of NBR requires low catalyst loadings.

The present invention accordingly has for its object to provide a catalyst system for an efficient metathesis of nitrile rubber at low catalyst loading which does not lead to the gelling of the polymer. The system shall be applicable to various catalysts.

It has now been found that, surprisingly and in contrast to the teaching of the prior art, the addition of a phenolic compound as a co-activator results in a controlling and significant enhancement of the metathesis efficiency of metathesis catalysts containing at least one N-heterocyclic carbene ligand (NHC ligand). Within the limits of measuring accuracy purified NBR without phenolic compounds does not show any metathesis reaction leading to molecular weight degradation in the presence of metathesis catalysts. Only by addition of the phenolic compound is the metathesis reaction observed with a significant molecular weight degradation. The extent of the molecular weight degradation reaction is significantly enhanced compared to the prior art and, entirely surprisingly, shows a different reaction profile. The combination of the catalyst with the phenolic compound as a co-activator makes it possible to achieve a lower molecular weight in a shorter time. The amount of catalyst to be employed to achieve a particular molecular weight can be reduced in this way.

The present invention accordingly provides a catalyst system comprising
(i) a metathesis catalyst containing at least one N-heterocyclic carbene ligand and
(ii) at least one phenolic compound of general formula (Z1)

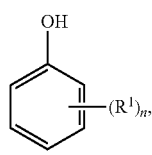
(Z1)

wherein
n may take the values 1, 2, 3, 4 or 5 and
$R^1$ each independently represent hydrogen, $(C_1-C_{18})$-alkyl, $(C_3-C_{18})$-cycloalkyl, $(C_2-C_{18})$-alkenyl, $(C_2-C_{18})$-alkynyl, $(C_8-C_{10})$-aryl, $(C_6-C_{24})$-alkaryl, $(C_8-C_{24})$-aralkyl, amino, $—N(R^2)_2$ where $R^2=H$ or $(C_1-C_{18})$-alkyl, $—NO_2$, $(C_1-C_{18})$-alkoxy, $—CHO$, $—CN$, $(C_1-C_{18})$-heteroalkyl, $(C_3-C_{10})$-heteroaryl, $—COO(R^2)$ where $R^2=H$ or $(C_1-C_{18})$-alkyl, $—CO—O—CO(R^2)$ where $R^2=H$ or $(C_1-C_{18})$-alkyl, $—(CH_2)_n—COO—(CH_2)_n—H$ wherein n are each independently 1 to 18, $—COX$ where $X=Cl$ or $Br$, $—CON(R^2)_2$ where $R^2=H$ or $(C_1-C_{18})$-alkyl, or a halogen or
a phenolic compound of general formula (Z2)

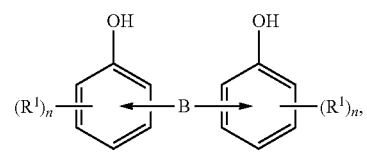
(Z2)

wherein
n may take the values 1, 2, 3, 4 or 5 and
$R^1$ each independently represent hydrogen, $(C_1-C_{18})$-alkyl, $(C_3-C_{18})$-cycloalkyl, $(C_2-C_{18})$-alkenyl, $(C_2-C_{18})$-alkynyl, $(C_8-C_{10})$-aryl, $(C_6-C_{24})$-alkaryl, $(C_8-C_{24})$-aralkyl, amino, $—N(R^2)_2$ where $R^2=H$ or $(C_1-C_{18})$-alkyl, $—NO_2$, $(C_1-C_{18})$-alkoxy, $—CHO$, $—CN$, $(C_1-C_{18})$-heteroalkyl, $(C_3-C_{10})$-heteroaryl, $—COO(R^2)$ where $R^2=H$ or $(C_1-C_{18})$-alkyl, $—CO—O—CO(R^2)$ where $R^2=H$ or $(C_1-C_{18})$-alkyl, $—(CH_2)_n—COO—(CH_2)_n—H$ wherein n are each independently 1 to 18, $—COX$ where $X=Cl$ or $Br$, $—CON(R^2)_2$ where $R^2=H$ or $(C_1-C_{18})$-alkyl, or a halogen and
B represents a bond, nitrogen or an alkyl group.

In the context of the present application and invention all of the above and below definitions of radicals, parameters or elucidations recited generally or in preferred ranges may be combined with one another in any desired manner, including between the respective ranges and preferred ranges.

The term "substituted" as used in the context of the various types of metathesis catalysts or phenolic compounds of general formula (Z1) or (Z2) is in the context of the present application to be understood as meaning that a hydrogen atom on an indicated radical or atom is replaced by one of the groups specified in each case, with the proviso that the valency of the indicated atom is not exceeded and the substitution leads to a stable compound.

Metathesis Catalyst

The metathesis catalysts employable according to the invention are osmium- or ruthenium-based complex catalysts containing at least one N-heterocyclic carbene ligand (NHC-ligand). These complex catalysts have the common structural feature that they comprise at least one N-heterocyclic carbene ligand bonded to the metal in a carbene-like manner. In a preferred embodiment the complex catalyst comprises two N-heterocyclic carbene ligands, i.e. two ligands bonded to the central metal of the complex in a carbene-like manner.

Suitable catalyst systems according to the invention are for example catalyst systems which in addition to at least one phenolic compound of general formula (Z1) or (Z2) comprise a catalyst of general formula (A),

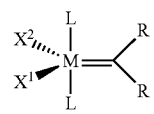
(A)

wherein
M represents osmium or ruthenium,
$X^1$ and $X^2$ are identical or different and represent two ligands, preferably anionic ligands, L represents identical or different ligands, preferably neutral electron donors, wherein at least one ligand L represents an N-heterocyclic carbene ligand, R are identical or different and represent hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulfonyl, preferably $C_1$-$C_{20}$-alkylsulfonyl, or alkylsulfinyl, preferably $C_1$-$C_{20}$-alkylsulfinyl, wherein all of these radicals may each optionally be substituted by one or more alkyl, halogen, alkoxy, aryl or heteroaryl radicals, or alternatively the two R radicals together with the common carbon atom to which they are bonded are bridged to form a cyclic group which may be aliphatic or aromatic in nature, is optionally substituted and may contain one or more heteroatoms.

In a preferred embodiment these catalyst systems comprise not only a catalyst of general formula (A) but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis((octylthio)methyl)phenol, 2,2'-methylenebis(4-methyl-6-nonylphenol), phenol, 2,2'-bisphenol and bis(4-hydroxyphenyl)methane.

In preferred catalysts of general formula (A) one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulfonyl or $C_1$-$C_{20}$-alkylsulfinyl, wherein all of these radicals may each be substituted by one or more alkyl, halogen, alkoxy, aryl or heteroaryl radicals.

In the catalysts of general formula (A) $X^1$ and $X^2$ are identical or different and represent two ligands, preferably anionic ligands.

$X^1$ and $X^2$ may represent for example hydrogen, halogen, pseudohalogen, linear or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl radicals.

The abovementioned radicals $X^1$ and $X^2$ may also be substituted by one or more further radicals, for example by halogen, preferably fluorine, $C_1$-$C_{10}$-alkyl, $C_1$-$C_{10}$-alkoxy or $C_6$-$C_{24}$-aryl, wherein the latter radicals too may in turn optionally be substituted by one or more substituents selected from the group comprising halogen, preferably fluorine, $C_1$-$C_5$-alkyl, $C_1$-$C_5$-alkoxy and phenyl.

In a preferred embodiment, $X^1$ and $X^2$ are identical or different and represent halogen, especially fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulfonate.

In a particularly preferred embodiment, $X^1$ and $X^2$ are identical and represent halogen, especially chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulfonate).

In general formula (A) L are identical or different ligands, wherein at least one ligand L represents an N-heterocyclic carbene ligand.

The other ligand L may be for example a phosphine, sulfonated phosphine, phosphate, phosphinite, phosphonite, arsine, stibine, ether, amine, amide, sulfoxide, carboxyl, nitrosyl, pyridine, thioether or imidazolidine ("Im") ligand.

It is preferable when the other ligand L is a $C_6$-$C_{24}$-aryl-, $C_1$-$C_{10}$-alkyl- or $C_3$-$C_{20}$-cycloalkylphosphine ligand, a sulfonated $C_6$-$C_{24}$-aryl- or sulfonated $C_1$-$C_{10}$-alkylphosphine ligand, a $C_6$-$C_{24}$-aryl- or $C_1$-$C_{10}$-alkylphosphinite ligand, a $C_6$-$C_{24}$-aryl- or $C_1$-$C_{10}$-alkylphosphonite ligand, a $C_6$-$C_{24}$-aryl- or $C_1$-$C_{10}$-alkylphosphite ligand, a $C_6$-$C_{24}$-aryl- or $C_1$-$C_{10}$-alkylarsine ligand, a $C_6$-$C_{24}$-aryl- or $C_1$-$C_{10}$-alkylamine ligand, a pyridine ligand, a $C_6$-$C_{24}$-aryl- or $C_1$-$C_{10}$-alkylsulfoxide ligand, a $C_6$-$C_{24}$-aryl ether or $C_1$-$C_{10}$-alkyl ether ligand or a $C_6$-$C_{24}$-aryl- or $C_1$-$C_{10}$-alkylamide ligand, all of which may each be substituted by a phenyl group which is in turn optionally substituted by a halogen, $C_1$-$C_5$-alkyl or $C_1$-$C_5$-alkoxy radical.

The term "phosphine" includes, for example, $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$.

The term "phosphinite" includes, for example, triphenylphosphinite, tricyclohexylphosphinite, triisopropylphosphinite and methyldiphenylphosphinite.

The term "phosphite" includes, for example, triphenylphosphite, tricyclohexylphosphite, tri-tert-butylphosphite, triisopropylphosphite and methyldiphenylphosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

The term "pyridine" shall be understood in the context of the present application as an umbrella term for all nitrogen-containing ligands as specified in WO-A-03/011455. Examples thereof include: pyridine, picolines (α-, β-, and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

The at least one ligand L which is an imidazolidine radical (Im) typically has a structure of general formula (IIa) or (IIb),

(IIa)

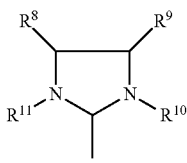

(IIb)

wherein $R^8$, $R^9$, $R^{10}$, $R^{11}$ are identical or different and represent hydrogen, linear or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_8$-$C_{20}$-arylthio, $C_1$-$C_{20}$-alkylsulfonyl, $C_1$-$C_{20}$-alkylsulfonate, $C_8$-$C_{20}$-arylsulfonate or $C_1$-$C_{20}$-alkylsulfinyl.

One or more of the radicals $R^8$, $R^9$, $R^{10}$, $R^{11}$ may optionally be independently substituted by one or more substituents, preferably straight-chain or branched $C_1$-$C_{10}$-alkyl, $C_3$-$C_8$-cycloalkyl, $C_1$-$C_{10}$-alkoxy or $C_8$-$C_{24}$-aryl, wherein these abovementioned substituents may in turn be substituted by one or more radicals, preferably selected from the group of halogen, especially chlorine or bromine, $C_1$-$C_5$-alkyl, $C_1$-$C_5$-alkoxy and phenyl.

Merely for clarity it is noted that the structures of the imidazolidine radical shown in general formulae (IIa) and (IIb) in the context of the present application are equivalent to the structures (IIa') and (IIb') often also found in the literature for this imidazolidine radical (Im) which emphasize the carbene character of the imidazolidine radical. This also applies correspondingly to the accompanying preferred structures (IIIa)-(IIIf) shown hereinbelow.

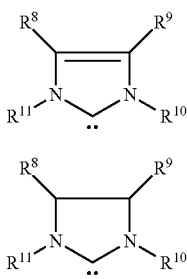

(IIa')

(IIb')

In a preferred embodiment of the catalysts of general formula (A), $R^8$ and $R^9$ independently represent hydrogen, $C_8$-$C_{24}$-aryl, particularly preferably phenyl, linear or branched $C_1$-$C_{10}$-alkyl, particularly preferably propyl or butyl, or together with the carbon atoms to which they are bonded form a cycloalkyl or aryl radical, wherein all abovementioned radicals may in turn optionally be substituted by one or more further radicals selected from the group comprising straight-chain or branched $C_1$-$C_{10}$-alkyl, $C_1$-$C_{10}$-alkoxy, $C_8$-$C_{24}$-aryl and a functional group selected from the group of hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

In a preferred embodiment of the catalysts of general formula (A) the radicals $R^{10}$ and $R^{11}$ are further identical or different and represent linear or branched $C_1$-$C_{10}$-alkyl, particularly preferably isopropyl or neopentyl, $C_3$-$C_{10}$-cycloalkyl, preferably adamantyl, $C_8$-$C_{24}$-aryl, particularly preferably phenyl, $C_1$-$C_{10}$-alkylsulfonate, particularly preferably methanesulfonate, $C_8$-$C_{10}$-arylsulfonate, particularly preferably p-toluenesulfonate.

The abovementioned radicals represented by $R^{10}$ and $R^{11}$ are optionally substituted by one or more further radicals selected from the group comprising linear or branched $C_1$-$C_5$-alkyl, especially methyl, $C_1$-$C_5$-alkoxy, aryl and a functional group selected from the group of hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

In particular, the $R^{10}$ and $R^{11}$ radicals may be identical or different and represent isopropyl, neopentyl, adamantyl, mesityl or 2,6-diisopropylphenyl.

Particularly preferred imidazolidine radicals (Im) have the following structures (IIIa) to (IIIf), wherein Ph in each case represents a phenyl radical, Bu represents a butyl radical and Mes in each case represents a 2,4,6-trimethylphenyl radical or Mes alternatively in all cases represents 2,6-diisopropylphenyl.

(IIIa)

(IIIb)

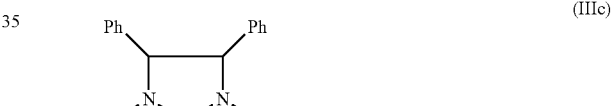

(IIIc)

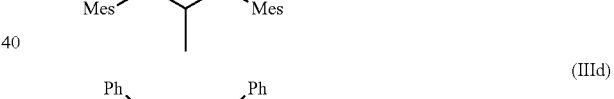

(IIId)

(IIIe)

(IIIf)

A very wide variety of different representatives of the catalysts of formula (A) is known in principle, for example from WO-A-96/04289 and WO-A-97/06185.

Alternatively to the preferred Im radicals one of the ligands L in general formula (A) preferably also represents a trialkylphosphine ligand, wherein at least one of the alkyl groups represents a secondary alkyl group or a cycloalkyl group, preferably isopropyl, isobutyl, sec-butyl, neopentyl, cyclopentyl or cyclohexyl.

It is particularly preferable when in general formula (A) one of the ligands L represents a trialkylphosphine ligand, wherein at least one of the alkyl groups represents a secondary alkyl group or a cycloalkyl group, preferably isopropyl, isobutyl, sec-butyl, neopentyl, cyclopentyl or cyclohexyl.

Particular preference is given to catalyst systems containing not only at least one phenolic compound of general formula (Z1) or (Z2) but also a catalyst of structure (V) (Grubbs II catalyst).

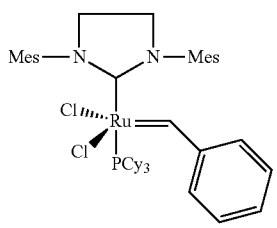

(V)

Also suitable as catalyst systems according to the invention are catalyst systems which comprise not only at least one phenolic compound of general formula (Z1) or (Z2) but also a catalyst of general formula (B),

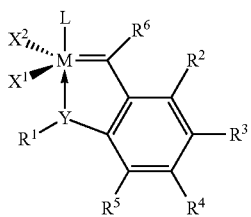

(B)

wherein

M represents ruthenium or osmium, $X^1$ and $X^2$ are identical or different ligands, preferably anionic ligands, Y represents oxygen (O), sulfur (S), an N—$R^1$ radical or a P—$R^1$ radical, wherein $R^1$ is as defined hereinbelow, $R^1$ represents an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, each of which may optionally be substituted by one or more alkyl, halogen, alkoxy, aryl or heteroaryl radicals, $R^2$, $R^3$, $R^4$ and $R^5$ are identical or different and represent hydrogen, organic or inorganic radicals, $R^6$ is hydrogen or an alkyl, alkenyl, alkynyl or aryl radical and L is a ligand as defined for the formula (A).

These catalyst systems preferably comprise not only the catalyst of general formula (B) but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis ((octylthio)methyl)phenol, 2,2'-methylenebis(4-methyl-6-nonylphenol), phenol, 2,2'-bisphenol and bis(4-hydroxyphenyl)methane.

The catalysts of general formula (B) are known in principle. Representatives of this compound class are the catalysts described by Hoveyda et al. in US-A-2002/0107138 and Angew. Chem. Int. Ed. 2003, 42, 4592 and the catalysts described by Grela in WO-A-2004/035596, Eur. J. Org. Chem 2003, 963-966 and Angew. Chem. Int. Ed. 2002, 41, 4038 and in J. Org. Chem. 2004, 69, 6894-96 and Chem. Eur. J 2004, 10, 777-784. The catalysts are commercially available or producible according to the cited literature.

In the catalysts of general formula (B) L represents a ligand which typically has an electron donor function and can assume the same general, preferred and particularly preferred definitions as L in general formula (A).

In addition, L in general formula (B) preferably represents a $P(R^7)_3$ radical, wherein $R^7$ are independently $C_1$-$C_6$ alkyl, $C_3$-$C_8$-cycloalkyl or aryl, or else an optionally substituted imidazolidine radical ("Im").

$C_1$-$C_6$-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-Cycloalkyl comprises cyclopropyl, cyclobutyl, cyclopentyl, cyclohexyl, cycloheptyl and cyclooctyl.

Aryl comprises an aromatic radical having 6 to 24 skeleton carbon atoms. Preferred mono-, bi- or tricyclic carbocyclic aromatic radicals having 6 to 10 skeleton carbon atoms include, for example, phenyl, biphenyl, naphthyl, phenanthrenyl or anthracenyl.

The imidazolidine radical (Im) typically has a structure of general formula (IIa) or (IIb)

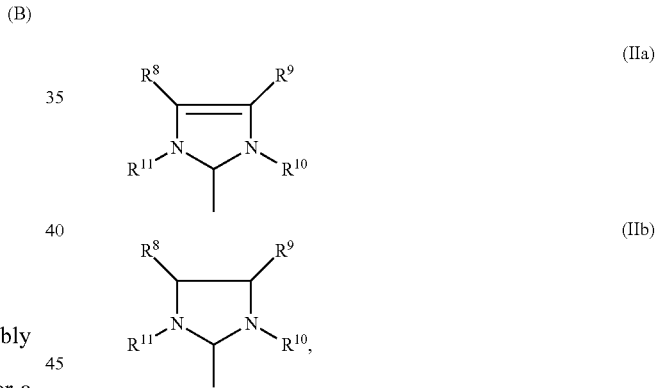

wherein $R^8$, $R^9$, $R^{10}$, $R^{11}$ are identical or different and represent hydrogen, linear or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulfonyl, $C_1$-$C_{20}$-alkylsulfonate, $C_6$-$C_{20}$-arylsulfonate or $C_1$-$C_{20}$-alkylsulfinyl.

One or more of the radicals $R^8$, $R^9$, $R^{10}$, $R^{11}$ may optionally be independently substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, wherein these abovementioned substituents may in turn be substituted by one or more radicals, preferably selected from the group of halogen, especially chlorine or bromine, $C_1$-$C_5$-alkyl, $C_1$-$C_6$-alkoxy and phenyl.

A preferred embodiment of the catalyst system according to the invention employs not only at least one phenolic compound of general formula (Z1) or (Z2) but also catalysts of general formula (B), wherein $R^8$ and $R^9$ independently represent hydrogen, $C_6$-$C_{24}$-aryl, particularly preferably phenyl, linear or branched $C_1$-$C_{10}$-alkyl, particularly preferably propyl or butyl, or together with the carbon atoms to which they are bonded form a cycloalkyl or aryl radical, wherein all abovementioned radicals may in turn optionally be substituted by one or more further radicals selected from the group comprising linear or branched $C_1$-$C_{10}$-alkyl, $C_1$-$C_{10}$-alkoxy, $C_6$-$C_{24}$-aryl and a functional group selected from the group of hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

A further preferred embodiment of the catalyst system according to the invention employs not only at least one phenolic compound of general formula (Z1) or (Z2) but also catalysts of general formula (B), wherein the radicals $R^{10}$ and $R^{11}$ are identical or different and represent linear or branched $C_1$-$C_{10}$-alkyl, particularly preferably isopropyl or neopentyl, $C_3$-$C_{10}$-cycloalkyl, preferably adamantyl, $C_6$-$C_{24}$-aryl, particularly preferably phenyl, $C_1$-$C_{10}$-alkylsulfonate, particularly preferably methanesulfonate, or $C_6$-$C_{10}$-arylsulfonate, particularly preferably p-toluenesulfonate.

The abovementioned radicals represented by $R^{10}$ and $R^{11}$ are optionally substituted by one or more further radicals selected from the group comprising linear or branched $C_1$-$C_5$-alkyl, especially methyl, $C_1$-$C_5$-alkoxy, aryl and a functional group selected from the group of hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

In particular, the radicals $R^{10}$ and $R^{11}$ may be identical or different and represent isopropyl, neopentyl, adamantyl or mesityl.

Particularly preferred imidazolidine radicals (Im) have the abovementioned structures (IIIa-IIIf), wherein Mes in each case represents 2,4,6-trimethylphenyl.

In the catalysts of general formula (B) $X^1$ and $X^2$ are identical or different and may represent for example hydrogen, halogen, pseudohalogen, linear or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthio, $C_6$-$C_{24}$-arylthio, $C_1$-$C_{20}$-alkylsulfonyl or $C_1$-$C_{20}$-alkylsulfinyl.

The abovementioned radicals $X^1$ and $X^2$ may also be substituted by one or more further radicals, for example by halogen, preferably fluorine, $C_1$-$C_{10}$-alkyl, $C_1$-$C_{10}$-alkoxy or $C_6$-$C_{24}$-aryl radicals, wherein the latter radicals too may in turn optionally be substituted by one or more substituents selected from the group comprising halogen, preferably fluorine, $C_1$-$C_5$-alkyl, $C_1$-$C_5$-alkoxy and phenyl.

In a preferred embodiment $X^1$ and $X^2$ are identical or different and represent halogen, especially fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulfonate.

In a particularly preferred embodiment $X^1$ and $X^2$ are identical and represent halogen, especially chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulfonate).

In general formula (B) the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, each of which may optionally be substituted by one or more alkyl, halogen, alkoxy, aryl or heteroaryl radicals.

The radical $R^1$ typically represents a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulfonyl or $C_1$-$C_{20}$-alkylsulfinyl radical, each of which may optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, wherein the latter may optionally be interrupted by one or more double or triple bonds or else one or more heteroatoms, preferably oxygen or nitrogen. $R^1$ is particularly preferably a linear or branched $C_1$-$C_{12}$-alkyl radical.

The $C_3$-$C_{20}$-cycloalkyl radical comprises for example cyclopropyl, cyclobutyl, cyclopentyl, cyclohexyl, cycloheptyl and cyclooctyl.

The $C_1$-$C_{12}$-alkyl radical may be for example methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. $R^1$ in particular represents methyl or isopropyl.

The $C_6$-$C_{24}$-aryl radical generally represents an aromatic radical having 6 to 24 skeleton carbon atoms. Preferred mono-, bi- or tricyclic carbocyclic aromatic radicals having 6 to 10 skeleton carbon atoms include, for example, phenyl, biphenyl, naphthyl, phenanthrenyl or anthracenyl.

In general formula (B) the radicals $R^2$, $R^3$, $R^4$ and $R^5$ are identical or different and may represent hydrogen or organic or inorganic radicals.

In a suitable embodiment $R^2$, $R^3$, $R^4$, $R^5$ are identical or different and represent hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radicals, each of which may optionally be substituted by one or more alkyl, alkoxy, halogen, aryl or heteroaryl radicals.

$R^2$, $R^3$, $R^4$, $R^5$ are typically identical or different and represent hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulfonyl or $C_1$-$C_{20}$-alkylsulfinyl radicals, each of which may optionally be substituted by one or more $C_1$-$C_{30}$-alkyl, $C_1$-$C_{20}$-alkoxy, halogen, $C_6$-$C_{24}$-aryl or heteroaryl radicals.

In an embodiment that has proven particularly advantageous $R^2$, $R^3$, $R^4$, $R^5$ are identical or different and represent nitro, linear or branched $C_1$-$C_{30}$-alkyl, $C_5$-$C_{20}$-cycloalkyl, linear or branched $C_1$-$C_{20}$-alkoxy radicals or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or else one or more heteroatoms, preferably oxygen or nitrogen.

In addition, two or more of the radicals $R^2$, $R^3$, $R^4$ or $R^5$ may also be bridged via aliphatic or aromatic structures. By including the carbon atoms to which they are bonded in the phenyl ring of formula (B), $R^3$ and $R^4$ may for example form a fused-on phenyl ring to result overall in a naphthyl structure.

In general formula (B), the $R^6$ radical is hydrogen or an alkyl, alkenyl, alkynyl or aryl radical. $R^6$ is preferably hydrogen or a $C_1$-$C_{30}$-alkyl, a $C_2$-$C_{20}$-alkenyl, a $C_2$-$C_{20}$-alkynyl or a $C_6$-$C_{24}$-aryl radical. $R^6$ is particularly preferably hydrogen.

Also suitable are catalyst systems which comprise not only at least one phenolic compound of general formula (Z1) or (Z2) but also a catalyst of general formula (B1),

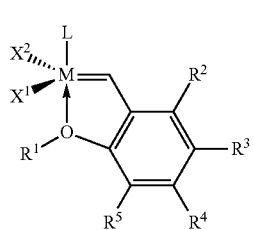

(B1)

wherein

M, L, $X^1$, $X^2$, $R^1$, $R^2$, $R^3$, $R^4$ and $R^5$ may have the general, preferred and particularly preferred definitions specified for general formula (B).

These catalyst systems preferably comprise not only the catalyst of general formula (B1) but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis((octylthio)methyl)phenol, 2,2'-methylenebis(4-methyl-6-nonylphenol), phenol, 2,2'-bisphenol and bis(4-hydroxyphenyl)methane.

The catalysts of general formula (B1) are known in principle from US-A-2002/0107138 (Hoveyda et al.) for example and are obtainable by methods of preparation reported therein.

Particular preference is given to catalyst systems which comprise catalysts of general formula (B1), wherein M represents ruthenium, $X^1$ and $X^2$ both represent halogen, especially both chlorine, $R^1$ represents a linear or branched $C_1$-$C_{12}$ alkyl radical, $R^2$, $R^3$, $R^4$, $R^5$ have the general and preferred definitions specified for general formula (B) and L has the general and preferred definitions specified for general formula (B).

Particular preference is given to catalyst systems which comprise catalysts of general formula (B1), wherein M represents ruthenium, $X^1$ and $X^2$ both represent chlorine, $R^1$ represents an isopropyl radical, $R^2$, $R^3$, $R^4$, $R^5$ all represent hydrogen and L represents an optionally substituted imidazolidine radical of formula (IIa) or (IIb),

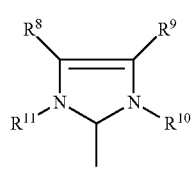

(IIa)

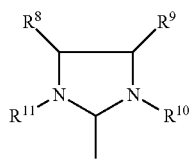

(IIb)

wherein $R^8$, $R^9$, $R^{10}$, $R^{11}$ are identical or different and represent hydrogen, linear or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_8$-$C_{24}$-arylthio, $C_1$-$C_{20}$-alkylsulfonyl, $C_1$-$C_{20}$-alkylsulfonate, $C_8$-$C_{24}$-arylsulfonate or $C_1$-$C_{20}$-alkylsulfinyl, wherein the abovementioned radicals may each be substituted by one or more substituents, preferably straight-chain or branched $C_1$-$C_{10}$-alkyl, $C_3$-$C_8$-cycloalkyl, $C_1$-$C_{10}$-alkoxy or $C_8$-$C_{24}$-aryl, wherein these abovementioned substituents may in turn also be substituted by one or more radicals, preferably selected from the group of halogen, especially chlorine or bromine, $C_1$-$C_5$-alkyl, $C_1$-$C_5$-alkoxy and phenyl.

Very particular preference is given to a catalyst system comprising at least one phenolic compound of general formula (Z1) or (Z2) and a metathesis catalyst containing at least one N-heterocyclic carbene ligand conforming to general formula (B1) and having the structure (VII), wherein Mes in each case represents 2,4,6-trimethylphenyl.

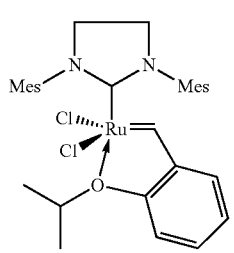

(VII)

This catalyst (VII) is also referred to in the literature as "Hoveyda catalyst".

Suitable catalyst systems further include those which comprise not only at least one phenolic compound of general formula (Z1) or (Z2) but also one catalyst which conforms to general structural formula (B1) and has one of the following formulae (VIII), (IX), (X), (XI), (XII), (XIII), (XIV) and (XV), wherein Mes in each case is 2,4,6-trimethylphenyl.

(VIII) 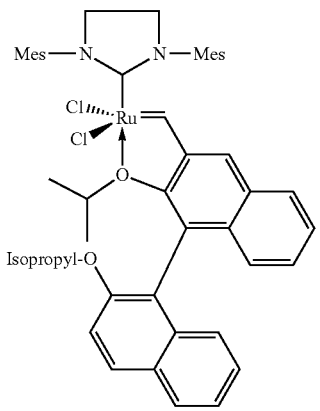

(IX) 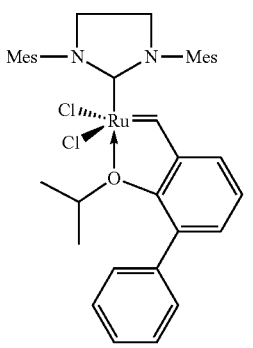

(X) 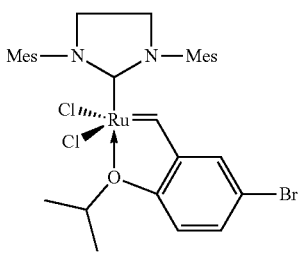

(XI) 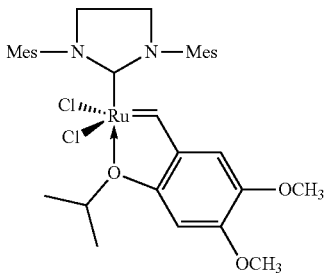

(XII) 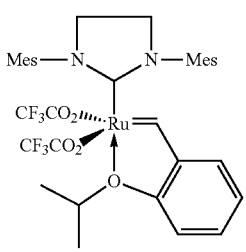

(XIII) 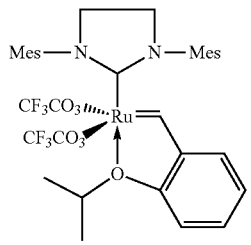

(XIV) 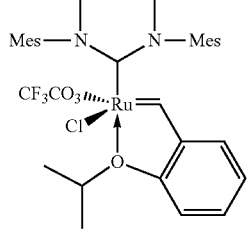

(XV) 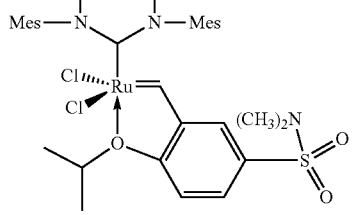

Catalyst (XV) is also referred to in the literature as "Zhan 1B catalyst".

One embodiment of the catalyst system preferably comprises not only the Zhan 1B catalyst but also 2-methyl-4,6-bis((octylthio)methyl)phenol.

A further catalyst system according to the invention comprises at least one phenolic compound of general formula (Z1) or (Z2) and a catalyst of general formula (B2),

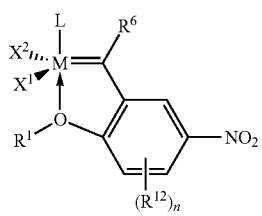

(B2)

wherein

M, L, $X^1$, $X^2$, $R^1$ and $R^6$ have the general and preferred definitions specified for formula (B), $R^{12}$ are identical or different and have the general and preferred definitions specified for the radicals $R^2$, $R^3$, $R^4$ and $R^5$ in formula (B), excluding hydrogen, and n is 0, 1, 2 or 3.

These catalyst systems preferably comprise not only the catalyst of general formula (B2) but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis((octylthio)methyl)phenol, 2,2'-methylenebis(4-methyl-6-nonylphenol), phenol, 2,2'-bisphenol and bis(4-hydroxyphenyl)methane.

The catalysts of general formula (B2) are known in principle from WO-A-2004/035596 (Grela) for example and are obtainable by methods of preparation reported therein.

Particular preference is given to catalyst systems which comprise at least one phenolic compound of general formula (Z1) or (Z2) and a catalyst of general formula (B2), wherein M represents ruthenium, $X^1$ and $X^2$ both represent halogen, especially both chlorine, $R^1$ represents a linear or branched $C_1$-$C_{12}$ alkyl radical, $R^{12}$ is as defined for the general formula (B2), n is 0, 1, 2 or 3, $R^6$ represents hydrogen and L is as defined for general formula (B).

Especial preference is given to catalyst systems which comprise at least one phenolic compound of general formula (Z1) or (Z2) and a catalyst of general formula (B2), wherein M represents ruthenium, $X^1$ and $X^2$ both represent chlorine, $R^1$ represents an isopropyl radical, n is 0 and L represents an optionally substituted imidazolidine radical of formula (IIa) or (IIb), wherein $R^8$, $R^9$, $R^{10}$, $R^{11}$ are identical or different and are as defined for the especially preferred catalysts of general formula (B1).

These catalyst systems preferably comprise not only the catalyst having the following structure (XVI) but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis((octylthio)methyl)phenol, 2,2'-methylenebis(4-methyl-6-nonylphenol), phenol, 2,2'-bisphenol and bis(4-hydroxyphenyl)methane.

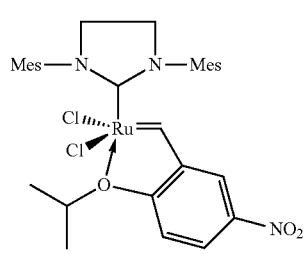

(XVI)

In the literature the catalyst (XVI) is also referred to as "Grela catalyst" (1,3-bis(2,4,6-trimethylphenyl)-2-imidazolidinylidene)(2-isopropoxy-5-nitrobenzylidene)ruthenium (VI)chloride.

A further suitable catalyst system comprises at least one phenolic compound of general formula (Z1) or (Z2) and a catalyst conforming to general formula (B2) and having the following structure (XVII), wherein Mes in each case represents 2,4,6-trimethylphenyl.

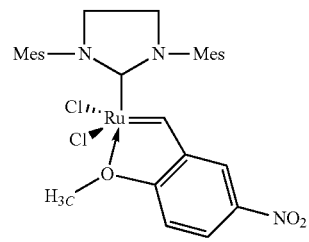

(XVII)

All of the abovementioned catalysts of type (B) may either be employed in the reaction mixture for the NBR metathesis reaction as such or else applied to and immobilized on a solid support. Suitable solid phases or supports include materials which are firstly inert with respect to the metathesis reaction mixture and secondly do not impair the activity of the catalyst. Useful for immobilization of the catalyst are for example metals, glass, polymers, ceramic, organic polymer beads or else inorganic sol-gels, carbon black, silica, silicates, calcium carbonate and barium sulfate.

A further alternative embodiment relates to a catalyst system according to the invention which comprises at least one phenolic compound of general formula (Z1) or (Z2) and a catalyst (N) comprising the general structural element (N1), wherein the carbon atom identified with an "*" is bonded to the catalyst base skeleton via one or more double bonds

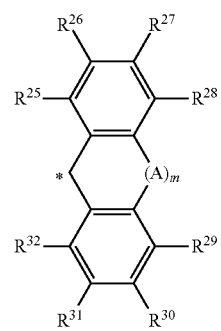

(N1)

and wherein $R^{25}$-$R^{32}$ are identical or different and represent hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulfonate (—$SO_3$—), —$OSO_3$—, —$PO_3$— or $OPO_3$— or represent alkyl, cycloalkyl, alkenyl, alkynyl, aryl, carbon/late, alkoxy, alkenyloxy, alkynyloxy, aryloxy, alkoxycarbonyl, alkylamino, alkylthio, arylthio, alkylsulfonyl, alkylsulfinyl, dialkylamino, alkylsilyl or alkoxysilyl, wherein each of these radicals may optionally be substituted by one or more alkyl, halogen, alkoxy, aryl or heteroaryl radicals, or alternatively by including the ring carbon atoms to which they are bonded in each case two directly adjacent radicals from the group of $R^{25}$-$R^{32}$ form a cyclic group, preferably an aromatic system, by bridging or alternatively $R^8$ is optionally bridged with another ligand of the metathesis catalyst containing at least one N-heterocyclic carbene ligand, m is 0 or 1 and A represents oxygen, sulfur, $C(R^{33}R^{34})$, $N-R^{35}$, $-C(R^{36})=C(R^{37})-$, $-C(R^{38})(R^{38})-C(R^{37})(R^{39})-$, wherein $R^{33}$-$R^{39}$ are identical or different and may each have the same definitions as the radicals $R^{25}$-$R^{32}$.

The catalysts according to the invention comprise the structural element of general formula (N1), wherein the carbon atom identified with an "*" is bonded to the catalyst base skeleton via one or more double bonds. When the carbon atom identified with an "*" is bonded to the catalyst base skeleton via two or more double bonds these double bonds may be cumulated or conjugated.

Such catalysts (N) are already described in EP-A-2 027 920 and are known to the person skilled in the art.

The catalysts (N) comprising a structural element of general formula (N1) include for example those having the following general formulae (N2a) and (N2b):

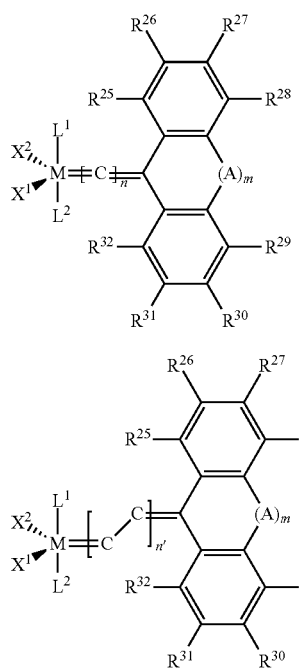

wherein

M is ruthenium or osmium, $X^1$ and $X^2$ are identical or different and represent two ligands, preferably anionic ligands, $L^1$ and $L^2$ represent identical or different ligands, preferably neutral electron donors, wherein alternatively $L^2$ may also be bridged to the radical $R^8$, n is 0, 1, 2 or 3, preferably 0, 1 or 2, n' is 1 or 2, preferably 1, and $R^{25}$-$R^{32}$, m and A are as defined in general formula (N1).

In the catalysts of general formula (N2a) the structural element of general formula (N1) is bonded to the central metal of the metathesis catalyst via a double bond (n=0) or via 2, 3 or 4 cumulated double bonds (when n=1, 2 or 3). In the catalysts of general formula (N2b) according to the invention the structural element of general formula (N1) is bonded to the metal of the metathesis catalyst via conjugated double bonds. In both cases, there is a double bond in the direction of the central metal of the metathesis catalyst on the carbon atom identified by "*".

The catalysts of general formulae (N2a) and (N2b) thus include catalysts in which the following general structural elements (N3)-(N9)

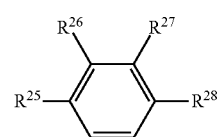

(N3)

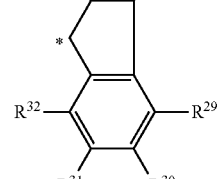

(N4)

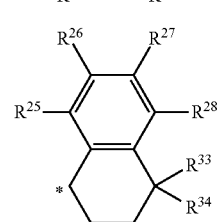

(N5)

(N6)

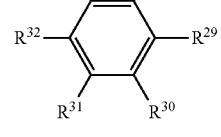

-continued

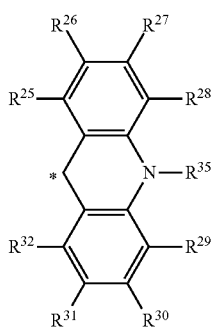
(N7)

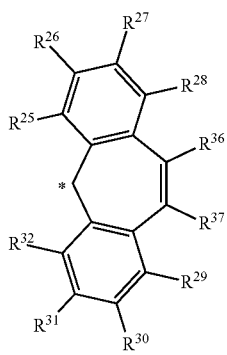
(N8)

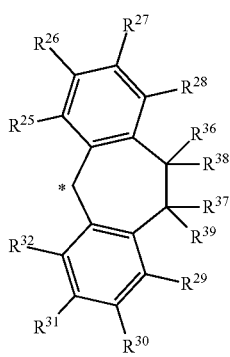
(N9)

are bonded to the catalyst base skeleton of general formula (N10a) or (N10b) via one or more double bonds via the carbon atom identified with an "k",

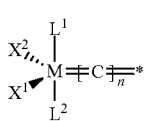
(N10a)

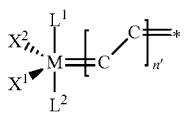
(N10b)

wherein $X^1$ and $X^2$, L1 and L2, n, n" and $R^{25}$-$R^{39}$ are as defined for general formulae (N2a) and (N2b).

The ruthenium or osmium carbene catalysts according to the invention typically have a coordination number of five.

In the structural element of general formula (N1), $R^{15}$-$R^{32}$ are identical or different and represent hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulfonate (—$SO_3$—), —$OSO_3$—, —$PO_3$— or $OPO_3$— or are alkyl, preferably $C_1$-$C_{20}$-alkyl, especially $C_1$-$C_6$-alkyl, cycloalkyl, preferably $C_3$-$C_{20}$-cycloalkyl, especially $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, especially phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulfonyl, preferably $C_1$-$C_{20}$-alkylsulfonyl, alkylsulfinyl, preferably $C_1$-$C_{20}$-alkylsulfinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, radicals, wherein each of these radicals may be substituted optionally by one or more alkyl, halogen, alkoxy, aryl or heteroaryl radicals, or alternatively by including the ring carbon atoms to which they are bonded in each case two directly adjacent radicals from the group of $R^{25}$-$R^{32}$ may form a cyclic group, preferably an aromatic system, by bridging or alternatively $R^8$ is optionally bridged with another ligand of the metathesis catalyst containing at least one N-heterocyclic carbene ligand, m is 0 or 1 and A represents oxygen, sulfur, $C(R^{33})(R^{34})$, N—$R^{35}$, —$C(R^{36})$═$C(R^{37})$— or —$C(R^{38})(R^{38})$—$C(R^{37})(R^{39})$—, wherein $R^{33}$-$R^{39}$ are identical or different and may each have the same preferred definitions as the radicals $R^1$-$R^8$.

$C_1$-$C_6$-alkyl in the structural element of general formula (N1) represents for example methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-cycloalkyl in the structural element of general formula (N1) represents for example cyclopropyl, cyclobutyl, cyclopentyl, cyclohexyl, cycloheptyl and cyclooctyl.

$C_6$-$C_{24}$-aryl in the structural element of general formula (N1) comprises an aromatic radical having 6 to 24 skeleton carbon atoms. Preferred mono-, bi- or tricyclic carbocyclic aromatic radicals having 6 to 10 skeleton carbon atoms include, for example, phenyl, biphenyl, naphthyl, phenanthrenyl or anthracenyl.

The radicals $X^1$ and $X^2$ in the structural element of general formula (N1) have the same general, preferred and particularly preferred definitions specified for catalysts of general formula A.

In the general formulae (N2a) and (N2b) and analogously in the general formulae (N10a) and (N10b), the radicals L1 and L2 are identical or different ligands, preferably neutral electron donors, and may have the same general, preferred and particularly preferred definitions specified for catalysts of general formula A.

Preference is given to catalysts of general formula (N2a) or (N2b) having a general structural unit (N1), wherein M represents ruthenium, $X^1$ and $X^2$ both represent halogen, n is 0, 1 or 2 in general formula (N2a) or n' is 1 in general formula (N2b), $L^1$ and $L^2$ are identical or different and have the general or preferred definitions specified for general formulae (N2a) and (N2b), $R^{25}$-$R^{32}$ are identical or different and have the general or preferred definitions specified for general formulae (N2a) and (N2b), m is either 0 or 1, and when m=1

A is oxygen, sulfur, C($C_1$-$C_{10}$-alkyl)$_2$, —C($C_1$-$C_{10}$-alkyl)$_2$-C($C_1$-$C_{10}$-alkyl)$_2$-, —C($C_1$-$C_{10}$-alkyl)=C($C_1$-$C_{10}$-alkyl)- or N($C_1$-$C_{10}$-alkyl).

Very particular preference is given to catalysts of formula (N2a) or (N2b) comprising a general structural unit (N1), wherein M represents ruthenium, $X^1$ and $X^2$ both represent chlorine, n is 0, 1 or 2 in general formula (N2a) or n' is 1 in general formula (N2b) or $L^1$ represents an imidazolidine radical of formulae (IIIa) to (IIIf), $L^2$ represents a sulfonated phosphine, phosphate, phosphinite, phosphonite, arsine, stibine, ether, amine, amide, sulfoxide, carboxyl, nitrosyl, pyridine radical, an imidazolidine radical of formulae (XIIa) to (XIIf) or a phosphine ligand, especially PPh$_3$, P(p-Tol)$_3$, P(o-Tol)$_3$, PPh(CH$_3$)$_2$, P(CF$_3$)$_3$, P(p-FC$_6$H$_4$)$_3$, P(p-CF$_3$C$_6$H$_4$)$_3$, P(C$_6$H$_4$—SO$_3$Na)$_3$, P(CH$_2$C$_6$H$_4$—SO$_3$Na)$_3$, P(isopropyl)$_3$, P(CHCH$_3$(CH$_2$CH$_3$))$_3$, P(cyclopentyl)$_3$, P(cyclohexyl)$_3$, P(neopentyl)$_3$ and P(neophenyl)$_3$, $R^{25}$-$R^{32}$ have the general or preferred definitions specified for general formulae (N2a) and (N2b), m is either 0 or 1, and when m=1

A represents oxygen, sulfur, C($C_1$-$C_{10}$-alkyl)$_2$, —C($C_1$-$C_{10}$-alkyl)$_2$-C($C_1$-$C_{10}$-alkyl)$_2$-, —C($C_1$-$C_{10}$-alkyl)=C($C_1$-$C_{10}$-alkyl)- or N($C_1$-$C_{10}$-alkyl).

In the case where $R^{25}$ is bridged with another ligand of the catalyst of formula N the catalysts of general formulae (N2a) and (N2b) conform to the following structures of general formulae (N13a) and (N13b) for example,

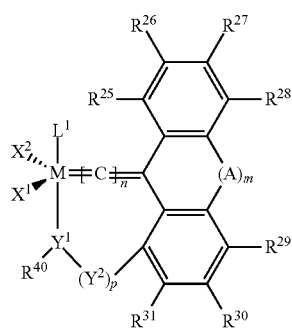

(N13a)

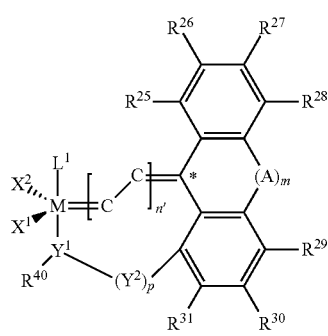

(N13b)

wherein $Y^1$ represents oxygen, sulfur, a radical N—$R^{41}$ or a radical P—$R^{41}$, wherein $R^{41}$ is as defined below, $R^{40}$ and $R^{41}$ are identical or different and represent an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, all of which may each optionally be substituted by one or more alkyl, halogen, alkoxy, aryl or heteroaryl radicals, p is 0 or 1 and $Y^2$ when p=1 represents —(CH$_2$)r- where r=1, 2 or 3, —C(=O)—CH$_2$—, —C(=O)—, —N=CH—, —N(H)—C(=O)—, or else alternatively the overall structural unit "—$Y^1$($R^{40}$)—($Y^2$)p-" represents (—N($R^{40}$)=CH—CH$_2$—), (—N($R^{40}$,$R^{41}$)=CH—CH$_2$—) and wherein M, $X^1$, $X^2$, $L^1$, $R^{25}$-$R^{32}$, A, m and n are as defined in general formulae (IIa) and (IIb).

Examples of catalysts of formula (N) include the following structures:

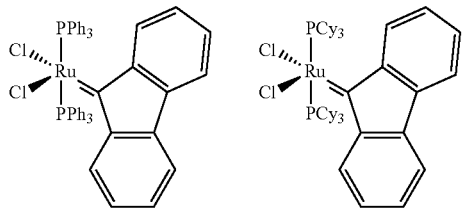

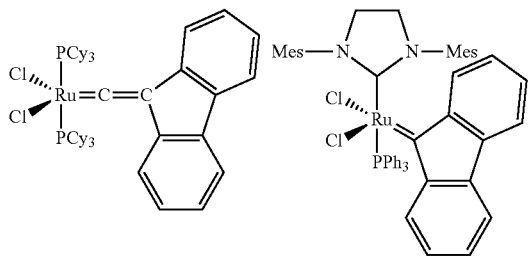

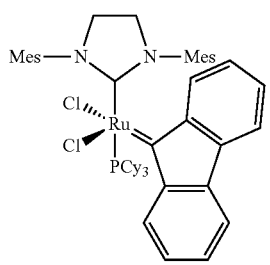

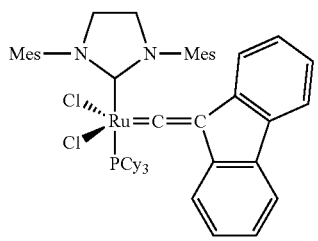

27
-continued
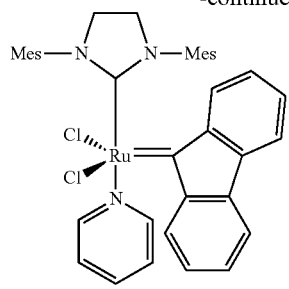
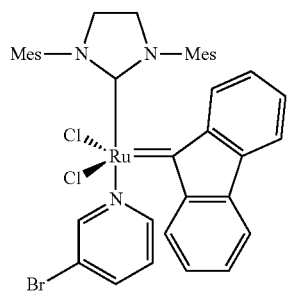
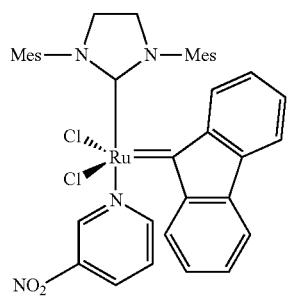
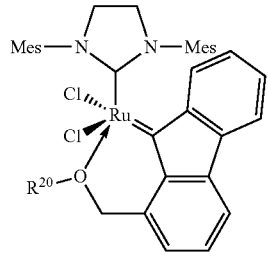
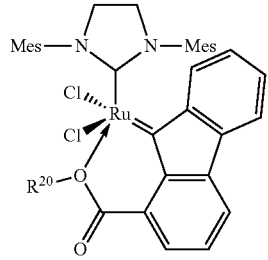
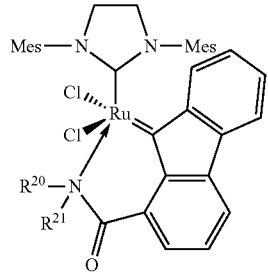
28
-continued
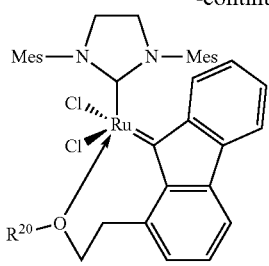
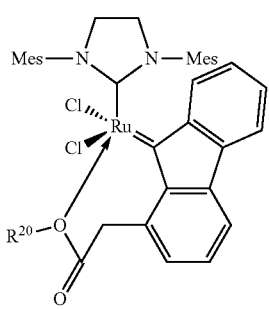
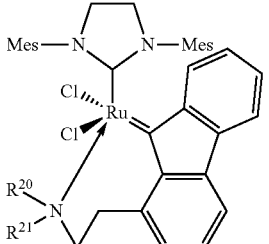
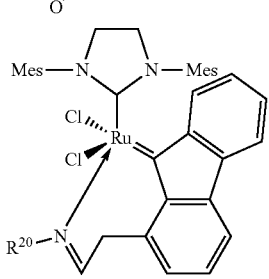
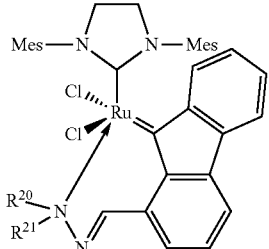
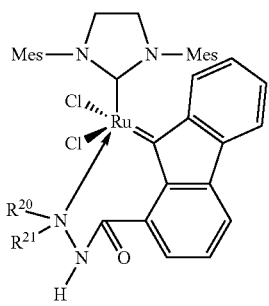

-continued

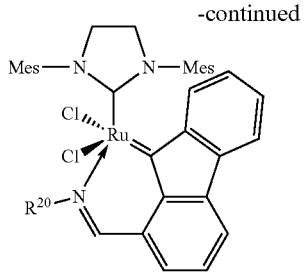

The catalyst systems according to the invention preferably contain not only the catalyst of the abovementioned structural formulae but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis((octylthio)methyl)phenol, 2,2'-methylenebis(4-methyl-6-nonylphenol), phenol, 2,2'-bisphenol and bis(4-hydroxyphenyl)methane.

Catalysts (N) are producible by reacting suitable catalyst precursor complexes with suitable diazo compounds when this synthesis is conducted within a specific temperature range and, at the same time, the molar ratio of the reactants to one another is within a chosen range. To this end for example a catalyst precursor compound is reacted with a compound of general formula (N1-Azo)

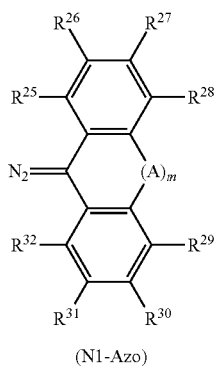

(N1-Azo)

wherein $R^{25}$-$R^{32}$, m and A are as defined for general formula (N1), wherein this reaction is performed
(i) at a temperature in the range from −20° C. to 100° C., preferably in the range from +10° C. to +80° C., particularly preferably in the range from +30 to +50° C. and
(ii) at a molar ratio of the catalyst precursor compound to the compound of general formula (N1-Azo) of 1:0.5 to 1:5, preferably 1:1.5 to 1:2.5, particularly preferably 1:2.

The compounds of general formula (N1-Azo) are 9-diazofluorene or a very wide variety of different derivatives thereof according to the meaning of the radicals $R^{25}$-$R^{32}$ and A. A very wide variety of different derivatives of 9-diazofluorene may be employed. In this way, a very wide variety of different fluorenylidene derivatives are obtainable.

The catalyst precursor compounds are ruthenium or osmium metathesis catalysts that do not yet contain any ligands comprising the general structural element (N1).

In this reaction, a ligand departs from the catalyst precursor compound and a carbene ligand containing the general structural element (N1) is accepted.

Suitable for the performance of the reaction are saturated, unsaturated and aromatic hydrocarbons, ethers and halogenated solvents. Preference is given to chlorinated solvents such as dichloromethane, 1,2-dichloroethane or chlorobenzene. Typically, the catalyst precursor compound in the form of the ruthenium or osmium precursor is initially charged in a preferably dried solvent. The concentration of the ruthenium or osmium precursor in the solvent is typically in the range from 15% to 25% by weight, preferably in the range from 15% to 20% by weight. Subsequently, the solution can be heated. Heating to a temperature in the range from 30 to 50° C. has been found to be particularly useful. Thereafter, the compound of general formula (N1-Azo) that has been dissolved in typically dried, preferably anhydrous, solvent is added. The concentration of the compound of general formula (N1-Azo) in the solvent is preferably in the range from 5% to 15% by weight, preferably about 10% by weight. To ensure completion of the reaction the mixture is reacted for a further 0.5 h to 1.5 h during which time the temperature is particularly preferably in the same range as recited hereinabove, i.e. at 30 to 50° C. Subsequently the solvent is removed and the residue is purified by extraction, for example with a mixture of hexane and an aromatic solvent.

Typically, the catalyst according to the invention is not obtained in pure form, but in an equimolar mixture resulting from the stoichiometry of the reaction with the reaction product of the compound of general formula (N1-Azo) with the departing ligand from the catalyst precursor compound used in the reaction. The departing ligand is preferably a phosphine ligand. This reaction product can be removed in order to obtain the pure catalyst according to the invention. For catalysis of metathesis reactions, however, it is possible to use not just the pure catalyst according to the invention but also the mixture of this catalyst according to the invention with the aforementioned reaction product.

The process described above is illustrated as follows:
In the case of the catalysts of general formulae (N2a) and (N2b), a catalyst precursor compound of general formula ("N2-precursor"),

(N2-precursor)

wherein
M, $X^1$, $X^2$, $L^1$ and $L^2$ have the same general and preferred definitions as in general formulae (N2a) and (N2b) and
AbL means departing ligand and can assume the same definitions as $L^1$ and $L^2$ as in general formulae (N2a) and (N2b) and preferably represents a phosphine ligand with the definitions specified for general formulae (N2a) and (N2b),
is reacted with a compound of general formula (N1-Azo) at a temperature in the range from −20° C. to 100° C., preferably in the range from +10° C. to +80° C., particularly preferably in the range from +30 to +50° C., and at a molar ratio of catalyst precursor compound of general formula (XVII) to compound of general formula (N1-Azo) of 1:0.5 to 1:5, preferably 1:1.5 to 1:2.5, particularly preferably 1:2. Further examples for producing such catalysts of formula (N) may be found in EP-A-2 027 920.

The catalyst systems according to the invention preferably contain not only the catalyst of general formula (N) but also at least one phenolic compound of general formula (Z1) or (Z2) selected from the group consisting of 2,2'-methylene-bis(4-methyl-6-tert-butylphenol), 2,6-di-tert-butyl-4-methylphenol, octadecyl 3-(3,5-di-tert-butyl-4-hydroxyphenyl), 2-methyl-4,6-bis((octylthio)methyl)phenol, 2,2'-methylenebis(4-methyl-6-nonylphenol), phenol, 2,2'-bisphenol and bis(4-hydroxyphenyl)methane.

A further alternative embodiment relates to a catalyst system according to the invention which comprises at least one phenolic compound of general formula (Z1) or (Z2) and a catalyst of general formula (O),

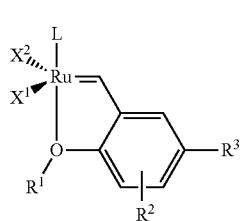

(O)

wherein $X^1$ and $X^2$ represent identical or different anionic ligands, preferably halogen, more preferably F, Cl, Br, I and particularly preferably Cl, $R^1$ represents a linear or branched, aliphatic $C_1$-$C_{20}$-alkyl, $C_3$-$C_{20}$-cycloalkyl, $C_5$-$C_{20}$-aryl, CHCH$_3$—CO—CH$_3$, preferably methyl, ethyl, isopropyl, isoamyl, t-butyl, CHCH$_3$—CO—CH$_3$, cyclohexyl or phenyl, $R^2$ represents hydrogen, halogen, $C_1$-$C_6$-alkyl or $C_1$-$C_6$-alkenyl, $R^3$ represents an electron-withdrawing radical, preferably —F, —Cl, —Br, —I, —NO, —NO$_2$, —CF$_3$, —OCF$_3$, —CN, —SCN, —NCO, —CNO, —COCH$_3$, —COCF$_3$, —CO—C$_2$F$_5$, —SO$_3$, —SO$_2$—N(CH$_3$)$_2$, arylsulfonyl, arylsulfinyl, arylcarbonyl, alkylcarbonyl, aryloxycarbonyl, or —NR$^4$—CO—R$^5$, wherein R$^4$ and R$^5$ are identical or different and may each independently represent H, $C_1$-$C_6$-alkyl, perhalogenated $C_1$-$C_6$-alkyl, aldehyde, ketone, ester, amide, nitrile, optionally substituted aryl, pyridinium-alkyl, pyridinium-perhaloalkyl or optionally substituted $C_5$-$C_6$ cyclohexyl, a radical $C_nH_{2n}Y$ or $C_nF_{2n}Y$ where n=1 to 6 and Y is an ionic group or a radical of any of formulae (EWG 1), (EWG 2) or (EWG 3)

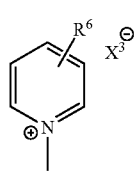

EWG 1

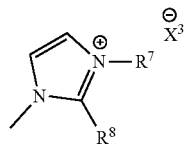

EWG 2

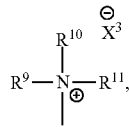

EWG 3 wherein $R^6$, $R^7$, $R^8$, $R^9$, $R^{10}$, $R^{11}$ independently represent H, $C_1$-$C_6$-alkyl, $C_1$-$C_6$-perhaloalkyl or $C_5$-$C_6$-aryl and $R^9$, $R^{10}$, $R^{11}$ can form a heterocycle, $X^3$ represents an anion, halogen, tetrafluoroborate ([BF$_4$]$^-$), [tetrakis(3,5-bis(trifluoromethyl) phenyl) borate] ([BARF]$^-$), hexafluorophosphate ([PF$_6$]$^-$), hexafluoroantimonate ([SbF$_6$]$^-$), hexafluoroarsenate ([AsF$_6$]$^-$) or trifluoromethylsulfonate ([(CF$_3$)$_2$N]$^-$);

$R^4$ and $R^5$ can form with the N and the C to which they are bonded a heterocycle of formula (EWG 4) oder (EWG 5),

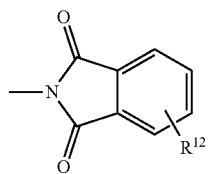

EWG 4

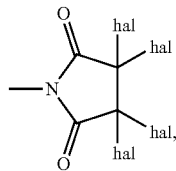

EWG 5 wherein hal represents halogen and $R^{12}$ represents hydrogen, $C_1$-$C_6$-alkyl, $C_5$-$C_6$-cycloalkyl or $C_5$-$C_6$-cycloaryl, L represents an NHC ligand of general formula (L1) or (L2),

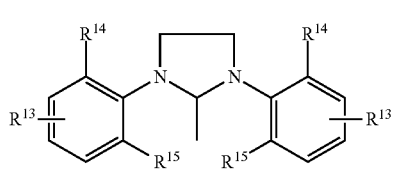

L1

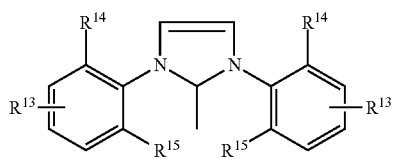

L2 wherein $R^{13}$ represents hydrogen, $C_1$-$C_6$-alkyl, $C_3$-$C_{30}$-cycloalkyl or $C_5$-$C_{30}$-aryl, $R^{14}$ and $R^{15}$ are identical or different and represent linear or branched $C_3$-$C_{30}$-alkyl, $C_3$-$C_{30}$-cycloalkyl, $C_5$-$C_{30}$-aryl, $C_5$-$C_{30}$-alkaryl, $C_5$-$C_{30}$-aralkyl, optionally having up to 3 heteroatoms, preferably isopropyl, i-butyl, tert-butyl, cyclohexyl oder phenyl.

A further alternative embodiment relates to a catalyst system according to the invention which comprises at least one phenolic compound of general formula (Z1) or (Z2) and a catalyst of general formula (P1), formula (P1)

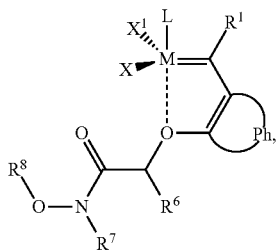

wherein
M is ruthenium or osmium,
X and X¹ are each independently anionic ligands,
L is an N-heterocyclic carbene ligand,
R¹ is hydrogen, $C_1$-$C_{20}$ alky or $C_5$-$C_{10}$ aryl,

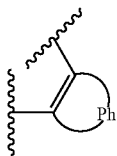

is an optionally substituted o-phenylene, wherein 2 or more substituents of the o-phenylene form an optionally substituted $C_4$-$C_8$-ring or an optionally substituted aromatic $C_5$-$C_{14}$-ring; and
$R^6$, $R^7$ and $R^8$ are each independently hydrogen, $C_1$-$C_6$ alkyl, optionally substituted $C_4$-$C_{10}$ heterocycle or optionally substituted $C_5$-$C_{14}$ aryl; wherein $R^7$ and $R^8$ may form a substituted or unsubstituted $C_4$-$C_8$ cyclic system,
or
a catalyst of general formula (P2)

formula (P2)

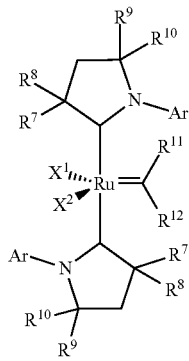

wherein
$X^1$ and $X^2$ each independently represent an anionic ligand selected from the group consisting of halogen atom, —CN, —SCN, —OR', —SR', —O(C═O)R', —O(SO₂)R', and —OSi(R')₃, wherein R' is a $C_1$-$C_{12}$ alkyl, $C_3$-$C_{12}$ cycloalkyl, $C_2$-$C_{12}$ alkenyl, $C_5$-$C_{20}$ aryl, optionally substituted by at least one $C_1$-$C_{12}$ alkyl, $C_1$-$C_{12}$ perfluoroalkyl, $C_1$-$C_{12}$ alkoxy, $C_5$-$C_{24}$ aryloxy or $C_5$-$C_{20}$ heteroaryloxy;
Ar is an aryl group substituted by hydrogen atoms or optionally substituted by at least one $C_1$-$C_{12}$ alkyl, $C_1$-$C_{12}$ perfluoroalkyl, $C_1$-$C_{12}$ alkoxy, $C_5$-$C_{24}$ aryloxy, $C_5$-$C_{20}$ heteroaryloxy or a halogen atom;

$R^7$, $R^8$, $R^9$, and $R^{16}$ are independently a hydrogen atom or $C_1$-$C_{12}$ alkyl, $R^7$ and/or $R^8$ may, together with $R^9$ and/or $R^{10}$, form a cyclic system, or independently represent $C_1$-$C_{12}$ alkyl, $C_3$-$C_{12}$ cycloalkyl, $C_2$-$C_{12}$ alkenyl, $C_5$-$C_{20}$ aryl, $C_1$-$C_5$ perfluoroalkyl, $C_7$-$C_{24}$ aralkyl, $C_5$-$C_{24}$ perfluoroaryl, optionally substituted by at least one $C_1$-$C_{12}$ alkyl, $C_1$-$C_{12}$ perfluoroalkyl, $C_1$-$C_{12}$ alkoxy, $C_5$-$C_{24}$ aryloxy, $C_5$-$C_{20}$ heteroaryloxy or a halogen atom;

$R^{11}$, $R^{12}$ are each independently a hydrogen atom, halogen atom, an optionally substituted or unsubstituted $C_1$-$C_{25}$ alkyl, an optionally substituted or unsubstituted $C_1$-$C_{25}$ perfluoroalkyl, an optionally substituted or unsubstituted $C_2$-$C_{25}$ alkene, an optionally substituted or unsubstituted $C_3$-$C_7$ cycloalkyl, an optionally substituted or unsubstituted $C_2$-$C_{25}$ alkenyl, an optionally substituted or unsubstituted $C_3$-$C_{25}$ cycloalkenyl, an optionally substituted or unsubstituted $C_2$-$C_{25}$ alkynyl, an optionally substituted or unsubstituted $C_3$-$C_{25}$ cycloalkynyl, an optionally substituted or unsubstituted $C_1$-$C_{25}$ alkoxy, an optionally substituted or unsubstituted $C_5$-$C_{24}$ aryloxy, an optionally substituted or unsubstituted $C_5$-Cal heteroaryloxy, an optionally substituted or unsubstituted $C_5$-$C_{24}$ aryl, an optionally substituted or unsubstituted $C_3$-$C_{20}$ heteroaryl, an optionally substituted or unsubstituted $C_7$-$C_{24}$ aralkyl, an optionally substituted or unsubstituted $C_5$-$C_{24}$ perfluoroaryl or an optionally substituted or unsubstituted 3-12-membered heterocycle;
wherein $R^{11}$ and $R^{12}$ substituents may form a ring selected from the group consisting of $C_3$-$C_7$ cycloalkyl, $C_3$-$C_{25}$ cycloalkenyl, $C_3$-$C_{25}$ cycloalkynyl, $C_5$-$C_{24}$ aryl, $C_3$-$C_{20}$ heteroaryl, $C_5$-$C_{24}$ perfluoroaryl, 3-12-membered heterocycle which may independently be substituted by one and/or more substituents selected from the group consisting of hydrogen atom, halogen atom, $C_1$-$C_{12}$ alkyl, $C_1$-$C_{25}$ perfluoroalkyl, $C_2$-$C_{25}$ alkene, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_3$-$C_{24}$ aryloxy, $C_3$-$C_{20}$ heteroaryloxy, $C_5$-$C_{24}$ aryl, $C_3$-$C_{20}$ heteroaryl, $C_7$-$C_{24}$ aralkyl, $C_5$-$C_{24}$ perfluoroaryl and a 3-12-membered heterocycle,
or
a catalyst of general formula (P3)

formula (P3)

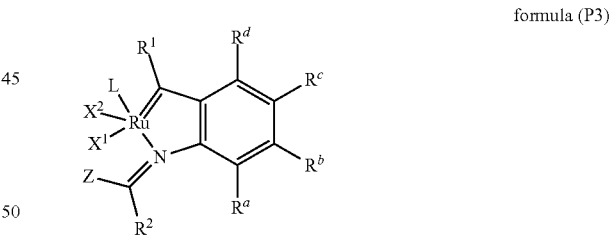

wherein
L is an N-heterocyclic carbene ligand;
$X^1$ and $X^2$ are independently an anionic ligand;
$R^1$, $R^2$, $R^a$, $R^b$, $R^c$, $R^d$ independently represent a hydrogen atom, a halogen atom, $C_1$-$C_{25}$ alkyl, $C_1$-$C_{25}$ perfluoroalkyl, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_5$-$C_{24}$ aryl, $C_5$-$C_{20}$ heteroaryl, 3-12-membered heterocycle, ether (—OR), thioether (—SR), nitro (—NO₂), cyano (—CN), carboxyl (—COOH), ester (—COOR'), amide (—CONR'R''), sulfone (—SO₂R), sulfonamide (—SO₂NR'R''), formyl or keto (—COR), wherein R' and R'' independently represent a hydrogen atom, $C_1$-$C_5$ alkyl, $C_1$-$C_5$ perfluoroalkyl, $C_5$-$C_{24}$ aryl, $C_5$-$C_{24}$ heteroaryl, $C_5$-$C_{24}$ perfluoroaryl;

Z independently represents a formyl or keto (—COR$^{Z'}$), carboxylic acid or ester (—COOR$^{Z'}$), thioester (—CSOR$^{Z'}$), nitro (—NO$_2$), amide (—CONR$^{Z'}$R$^{Z''}$), sulfone (—SO$_2$R$^{Z'}$), sulfonamide (—SO$_2$NR$^{Z'}$R$^{Z''}$), —CR$^{Z'}$R$^{Z''}$COR$^{Z'}$, —CR$^{Z'}$R$^{Z''}$COOR$^{Z'}$, —CR$^{Z'}$R$^{Z''}$CONR$^{Z'}$R$^{Z''}$, —CR$^{Z'}$R$^{Z''}$SO$_2$R$^{Z'}$ or —CR$^{Z'}$R$^{Z''}$SO$_2$NR$^{Z'}$R$^{Z''}$; wherein R$^{Z'}$ and R$^{Z''}$ independently represent a hydrogen atom, C$_1$-C$_5$ alkyl, C$_1$-C$_5$ perfluoroalkyl, C$_5$-C$_{24}$ aryl, C$_5$-C$_{24}$ heteroaryl or C$_5$-C$_{24}$ perfluoroaryl;

the anionic ligands X$^1$ and X$^2$ independently represent a halogen atom, —CN, —SCN, —SR$^4$, —O(C=O)R$^4$, —O(SO$_2$)R$^4$, —OP(O)R$_2^4$, —OSiR$_3^4$, wherein R$^4$ represents a C$_1$-C$_{12}$ alkyl, C$_3$-C$_{12}$ cycloalkyl, C$_2$-C$_{12}$ alkenyl or C$_5$-C$_{20}$ aryl, optionally substituted by at least one C$_1$-C$_{12}$ alkyl, C$_1$-C$_{12}$ perhaloalkyl, C$_1$-C$_{12}$ alkoxy or a halogen atom; and the ligand L is selected from the group consisting of N-heterocyclic carbenes of formulae 1a, 1b, 1c, 1d, 1e, 1f, 1g, 1h, 1j, 1k, 1l, 1m, 1n, 1o or 1p:

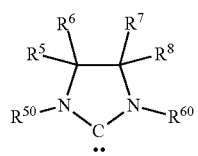

Formula 1a

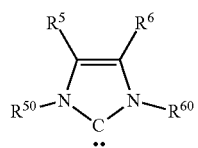

Formula 1b

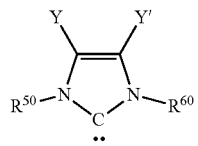

Formula 1c

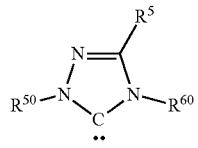

Formula 1d

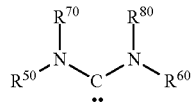

Formula 1e

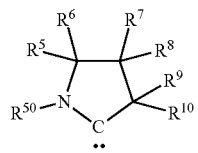

Formula 1f

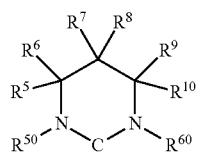

Formula 1g

-continued

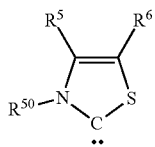

Formula 1h

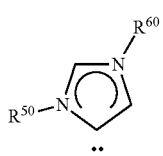

Formula 1i

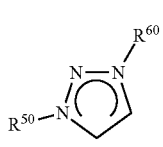

Formula 1j

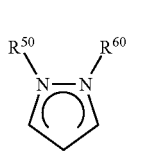

Formula 1k

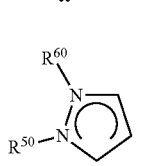

Formula 1l

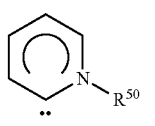

Formula 1m

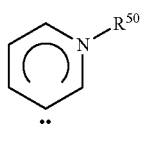

Formula 1n

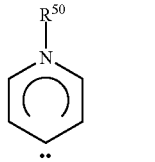

Formula 1o

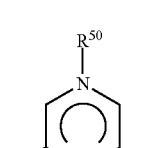

Formula 1p wherein R$^{50}$, R$^{60}$, R$^{70}$ and R$^{80}$ each independently represent C$_1$-C$_{12}$ alkyl, C$_3$-C$_{12}$ cycloalkyl, C$_2$-C$_{12}$ alkenyl, $C_5$-$C_{20}$ aryl or $C_5$-$C_{20}$ heteroaryl, optionally substituted by at least one $C_1$-$C_{12}$ alkyl, $C_1$-$C_{12}$ perhaloalkyl, $C_1$-$C_{12}$ alkoxy or a halogen atom;

$R^5$, $R^6$, $R^7$, $R^8$, $R^9$ and $R^{10}$ each independently represent a hydrogen atom, $C_1$-$C_{12}$ alkyl, $C_3$-$C_{12}$ cycloalkyl, $C_2$-$C_{12}$ alkenyl, $C_5$-$C_{20}$ aryl or $C_5$-$C_{20}$ heteroaryl, optionally substituted by at least one $C_1$-$C_{12}$ alkyl, $C_1$-$C_{12}$ perhaloalkyl, $C_1$-$C_{12}$ alkoxy or a halogen atom;

and each of the substituents selected from the group comprising $R^5$, $R^6$, $R^7$, $R^8$, $R^9$ and $R^{10}$ and also $R^{50}$, $R^{60}$, $R^{70}$ and $R^{80}$ may optionally form a cyclic or macrocyclic system with one another.

A further alternative embodiment relates to a catalyst system according to the invention which comprises at least one phenolic compound of general formula (Z1) or (Z2) and a catalyst of general formula (Q),

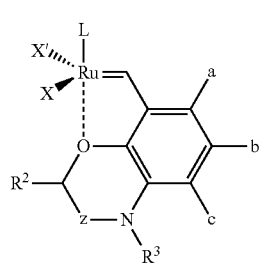

formula (Q)

wherein

X and $X^1$ are each independently halogens, preferably selected from the group consisting of Cl, Br and I, L is an uncharged ligand of formula $L^1$, $L^2$, $L^3$ or $L^4$,

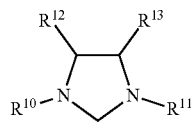

(L¹)

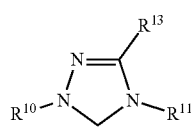

(L²)

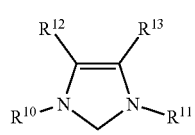

(L³)

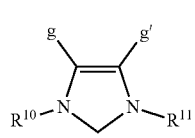

(L⁴)

wherein $R^{10}$ and $R^{11}$ are each independently a substituted or unsubstituted side chain comprising 1 to 30 carbon atoms and optionally comprising one or more functional groups, and wherein $R^{12}$ and $R^{13}$ are each independently H, $C_{1-6}$ alkyl, optionally substituted with an alkoxy radical $OR^{15}$, or aryl, optionally substituted with an alkoxy radical $OR^{15}$, or form a 3- or 4-membered alkene bridge, and wherein $R^{15}$ is selected from the group consisting of $C_{1-20}$ alkyl, aryl and $C_{7-18}$ aralkyl, and wherein g and g' are in each case halogens, z is a methyl or carbonyl group, a, b and c are in each case H;

$R^2$ is selected from the group consisting of H, $C_{1-12}$ alkyl, preferably methyl, ethyl or isopropyl, $C_{5-12}$ cycloalkyl, $C_{7-16}$ aralkyl or aryl; and $R^3$ is selected from the group consisting of H, $C_{5-12}$-cycloalkyl, $C_{7-16}$-aralkyl, aryl, $C_{1-12}$-haloalkyl, $C_{1-12}$-ammonium alkyl, $C_{1-12}$-pyridinium alkyl, $C_{1-12}$-aldehyde alkyl, $C_{1-12}$-nitroalkyl, nitrile or a radical selected from the group consisting of ketones $COR^4$, esters $CO_2R^4$, oxalates $COCO_2R^4$, sulfones $SO_2R^4$ or amides $CONHR^4$, wherein $R^4$ is selected from the group consisting of H, $C_{1-12}$-alkyl, $C_{5-12}$-cycloalkyl, $C_{7-16}$-aralkyl, aryl, $C_{1-12}$-haloalkyl, $C_{1-12}$-ammonium alkyl, $C_{1-12}$-pyridinium alkyl, $C_{1-12}$-aldehyde alkyl, $C_{1-12}$-nitroalkyl and nitrile, or $R^3$ is a side chain of formula $R^{3c}$, $R^{3d}$, $R^{3e}$, $R^{3f}$, $R^{3g}$, $R^{3h}$, $R^{3i}$, $R^{3j}$, $R^{3k}$, $R^{3l}$, $R^{3m}$, $R^{3n}$, $R^{3o}$ or $R^{3p}$:

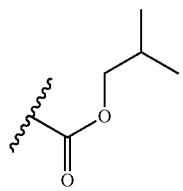

($R^{3c}$)

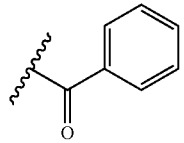

($R^{3d}$)

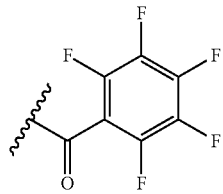

($R^{3e}$)

($R^{3f}$)

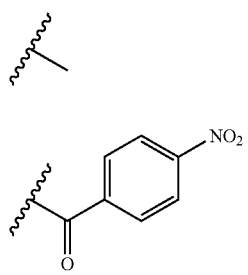

($R^{3g}$)

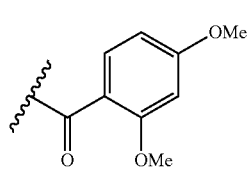

($R^{3h}$)

(R³ⁱ) 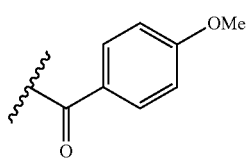

(R³ʲ) 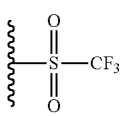

(R³ᵏ) 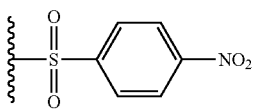

(R³ˡ) 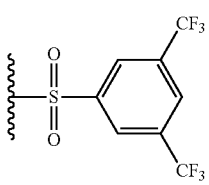

(R³ᵐ) 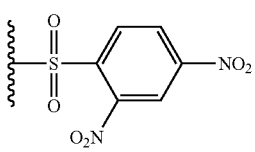

(R³ⁿ) 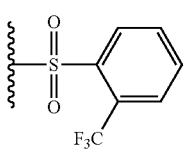

(R³ᵒ) 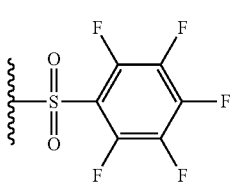

(R³ᵖ) 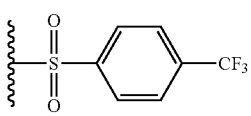

or, if z is methyl, R³ is a side chain of formula R³ᵃ or R³ᵇ:

(R³ᵃ) 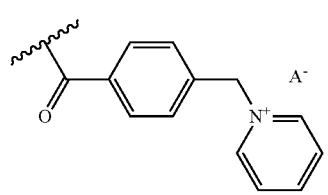

(R³ᵇ) 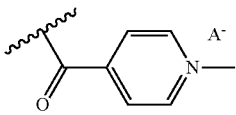

wherein A⁻ is selected from the group consisting of F⁻, Cl⁻, Br⁻, I⁻, tetrafluoroborate BF₄⁻, hexafluorophosphate PF₆⁻ and bis(trifluoromethylsulfonyl)amide NTf₂⁻.

Use of the Catalyst System

The present invention further relates to the use of the catalyst systems according to the invention in metathesis reactions. The metathesis reactions may be for example ring closing metatheses (RCM), cross metatheses (CM) or else ring opening metatheses (ROMP). To this end the compound/compounds to be subjected to metathesis are commonly contacted with the catalyst system according to the invention and reacted.

In the catalyst system according to the invention the metathesis catalyst and the phenolic compound of general formula (Z1) or (Z2) are employed in a molar ratio [metathesis catalyst:phenolic compound of general formula (Z1) or (Z2)]=1:(0.01-1000), preferably 1:(0.2-200) and particularly preferably 1:(1-111).

For use of the catalyst system in metathesis reactions according to the invention the phenolic compound of general formula (Z1) or (Z2) may be added in a solvent or dispersant or else without solvent/dispersant to the nitrile rubber or the solution thereof which is subsequently admixed with the metathesis catalyst to obtain the catalyst system according to the invention.

Employable solvents/dispersants in which the phenolic compound of general formula (Z1) or (Z2) is added to the nitrile rubber/the solution thereof include all known solvents and dispersants. The effectiveness of the addition of the phenolic compound of general formula (Z1) or (Z2) is not contingent on the compound of general formula (Z1) or (Z2) being soluble in the dispersant. Preferred solvents/dispersants comprise but are not limited to acetone, benzene, chlorobenzene, chloroform, cyclohexane, dichloromethane, diethyl ether, dioxane, 1-hexene, dimethylformamide, dimethylacetamide, dimethyl sulfone, dimethyl sulfoxide, methyl ethyl ketone, tetrahydrofuran, tetrahydropyran and toluene. The solvent/dispersant is preferably inert with regard to the metathesis catalyst.

It is preferable to use the catalyst systems for metathesis of nitrile rubber according to the invention. The use according to the invention is then a process for molecular weight degradation of nitrile rubber comprising contacting the nitrile rubber with the catalyst system according to the invention. This reaction is a cross metathesis.

Provided the catalyst systems according to the invention are used for the metathesis of nitrile rubber, the amount of the phenolic compound of general formula (Z1) or (Z2) is 0.0001 phr to 5 phr, preferably 0.001 phr to 2 phr, particularly preferably 0.05 to 1.0 phr, based on the nitrile rubber to be degraded (phr=parts by weight per 100 parts by weight of rubber).

For the use for NBR metathesis too the phenolic compound of general formula (Z1) or (Z2) may be added in a solvent/dispersant or else without solvent/dispersant to a solution of the nitrile rubber to be degraded which is subsequently admixed with the metathesis catalyst so that the entire catalyst system according to the invention is present in the reaction mixture.

The amount of the metathesis catalyst based on the employed nitrile rubber depends on the nature and also the catalytic activity of the specific metathesis catalyst. The amount of the employed metathesis catalyst is typically 1 to 1000 ppm of noble metal, preferably 2 to 500 ppm, in particular 5 to 250 ppm, based on the employed nitrile rubber.

The NBR metathesis may be performed in the absence or else in the presence of a co-olefin. This co-olefin is preferably a linear, branched or aromatic $C_2$-$C_{16}$-olefin. Suitable examples include ethylene, propylene, isobutene, styrene, 1-hexene or 1-octene. Preference is given to using 1-hexene or 1-octene. If the co-olefin is liquid (for example 1-hexene), the amount of the co-olefin is preferably in a range from 0.2% to 20% by weight based on the employed nitrile rubber. If the co-olefin is a gas, for instance ethylene, the amount of the co-olefin is chosen such that a pressure in the range from $1\times10^5$ Pa to $1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not negatively influence the reaction in any other way. Preferred solvents comprise but are not limited to dichloromethane, benzene, toluene, methyl ethyl ketone, acetone, tetrahydrofuran, tetrahydropyran, dioxane, 1-hexene, cyclohexane and chlorobenzene. Chlorobenzene is the particularly preferred solvent. In some cases, if the co-olefin can itself function as solvent, for instance in the case of 1-hexene, the addition of a further additional solvent can also be dispensed with.

The concentration of the nitrile rubber used in the reaction mixture for the metathesis is not critical but care should of course be taken to ensure that the reaction is not negatively influenced by too high a viscosity of the reaction mixture and the associated mixing problems. The concentration of the NBR in the reaction mixture is preferably in the range from 1% to 25% by weight, particularly preferably in the range from 5% to 20% by weight, based on the total reaction mixture.

The metathetic degradation is commonly performed at a temperature in the range from 10° C. to 150° C., preferably at a temperature in the range from 20° C. to 100° C.

The reaction time depends on a number of factors, for example on the type of NBR, the type of catalyst, the catalyst concentration used and the reaction temperature. The reaction has typically terminated within five hours under normal conditions. The progress of the metathesis can be monitored by standard analytical methods, for example by GPC measurements or by viscosity determination.

Phenolic Compound

The phenolic compound to be employed according to the invention is at least one phenolic compound of general formula (Z1)

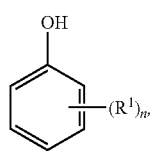

(Z1)

wherein
n may take the values 1, 2, 3, 4 or 5 and
$R^1$ each independently represent hydrogen, $(C_1$-$C_{18})$-alkyl, $(C_3$-$C_{18})$-cycloalkyl, $(C_2$-$C_{18})$-alkenyl, $(C_2$-$C_{18})$-alkynyl, $(C_8$-$C_{10})$-aryl, $(C_6$-$C_{24})$-alkaryl, $(C_8$-$C_{24})$-aralkyl, amino, —$N(R^2)_2$ where $R^2$=H or $(C_1$-$C_{18})$-alkyl, $NO_2$, $(C_1$-$C_{18})$-alkoxy, —CHO, —CN, $(C_1$-$C_{18})$-heteroalkyl, $(C_3$-$C_{10})$-heteroaryl, —$COO(R^2)$ where $R^2$=H or $(C_1$-$C_{18})$-alkyl, —CO—O—$CO(R^2)$ where $R^2$=H or $(C_1$-$C_{18})$-alkyl, —$(CH_2)_n$—COO—$(CH_2)_n$—H wherein n are each independently 1 to 18, —COX where X=Cl or Br, —CON $(R^2)_2$ where $R^2$=H or $(C_1$-$C_{18})$-alkyl, or a halogen,
or
at least one phenolic compound of general formula (Z2)

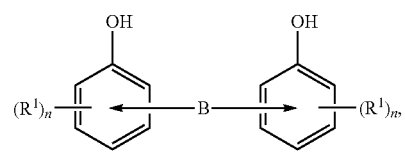

(Z2)

wherein
n may take the values 1, 2, 3, 4 or 5 and
$R^1$ each independently represent hydrogen, $(C_1$-$C_{18})$-alkyl, $(C_3$-$C_{18})$-cycloalkyl, $(C_2$-$C_{18})$-alkenyl, $(C_2$-$C_{18})$-alkynyl, $(C_8$-$C_{10})$-aryl, $(C_6$-$C_{24})$-alkaryl, $(C_8$-$C_{24})$-aralkyl, amino, —$N(R^2)_2$ where $R^2$=H or $(C_1$-$C_{18})$-alkyl, $NO_2$, $(C_1$-$C_{18})$-alkoxy, —CHO, —CN, $(C_1$-$C_{18})$-heteroalkyl, $(C_3$-$C_{10})$-heteroaryl, —$COO(R^2)$ where $R^2$=H or $(C_1$-$C_{18})$-alkyl, —CO—O—$CO(R^2)$ where $R^2$=H or $(C_1$-$C_{18})$-alkyl, —$(CH_2)_n$—COO—$(CH_2)_n$—H wherein n are each independently 1 to 18, —COX where X=Cl or Br, —CON $(R^2)_2$ where $R^2$=H or $(C_1$-$C_{18})$-alkyl, or a halogen and
B represents a bond, nitrogen or an alkyl group.

In preferred phenolic compounds of general formula (Z1) n takes the values 1, 2 or 3.

$R^1$
is preferably located ortho to the indicated hydroxyl radical in the case of phenolic compounds of general formula (Z1) where n=1,
in the case of phenolic compounds of general formula (Z1) where n=2 the two radicals $R^1$ are both ortho or, respectively, one is ortho and one is para, to the indicated hydroxyl radical and
in the case of phenolic compounds of general formula (Z1) where n=3 two radicals $R^1$ are ortho, and one radical $R^1$ is para, to the phenyl group.

The radicals $R^1$ may each independently represent
$(C_1$-$C_{18})$-alkyl, in particular a linear or branched $(C_1$-$C_8)$-alkyl, particularly preferably a branched $(C_1$-$C_4)$-alkyl such as for example isopropyl, sec-butyl, isobutyl or tert-butyl and very particularly preferably tert-butyl, or
$(C_3$-$C_{18})$-cycloalkyl, in particular cyclopropyl, cyclobutyl, cyclopentyl, cyclohexyl, cycloheptyl or cyclooctyl, very particularly cyclopropyl, cyclopentyl and cyclohexyl, or
$(C_2$-$C_{18})$-alkenyl having one or more carbon-carbon double bonds, in particular a linear or branched $(C_2$-$C_6)$-alkenyl radical, preferably vinyl, allyl, n-prop-1-en-1-yl and n-but-2-en-1-yl, or
$(C_2$-$C_{18})$-alkynyl having one or more carbon-carbon double bonds, or ($C_6$-$C_{10}$)-aryl, preferably phenyl, p-tolyl, 4-hydroxyphenyl, 1-naphthyl, 2-naphthyl, or ($C_6$-$C_{24}$)-alkaryl or ($C_6$-$C_{24}$)-aralkyl or —$NH_2$ or —$N(R^2)_2$ wherein $R^2$ conforms to the above- and below-mentioned definition of $R^1$, in particular a linear or branched alkylamino radical, preferably methylamino, ethylamino, n-propylamino, isopropylamino, tert-butylamino, dimethylamino, diethylamino, di-n-propylamino, diisopropylamino, di-t-butylamino, di-n-pentylamino, di-n-hexylamino, ethylmethylamino, isopropylmethylamino, n-butylethylamino and n-hexyl-1-pentylamino, —$NO_2$ or ($C_1$-$C_{18}$)-alkoxy, in particular a linear or branched ($C_1$-$C_6$)-alkoxy, for example and preferably methoxy, ethoxy, n-propoxy, isopropoxy, tert-butoxy, n-pentoxy and n-hexoxy, or —CHO or —CN or ($C_1$-$C_{18}$)-heteroalkyl having up to 5 heteroatoms from the group of S, O and/or N, preferably having one heteroatom, wherein the heteroalkyl may be bonded via a carbon atom or heteroatom, ($C_3$-$C_{10}$)-heteroaromatic having up to 5 heteroatoms from the group of S, O and/or N, preferably having up to 4 heteroatoms, wherein the heteroaromatic may be bonded via a carbon atom or heteroatom, for example and preferably pyridyl, pyrimidyl, pyridazinyl, thienyl, furyl, pyrrolyl, thiazolyl, oxazolyl, imidazolyl, indolyl, indazolyl, benzofuranyl, benzothiophenyl, quinolinyl, isoquinolinyl, particularly preferably pyridyl, pyrimidyl, pyridazinyl, furyl and thiazolyl, or a —$COO(R^2)$, —$(CH_2)_n$—COO—$(CH_2)_n$—H wherein n are each independently 1 to 18, —CO—O—$CO(R^2)$, —COX where X=Cl or Br, —$CON(R^2)_2$, $H_2N$—$NH(R^2)$, or a halogen, in particular fluorine, chlorine or bromine, particularly preferably bromine.

In a preferred embodiment $R^1$ independently represents ($C_1$-$C_{18}$)-alkyl, ($C_1$-$C_{18}$)-heteroalkyl or —$(CH_2)_n$—COO—$(CH_2)_n$—H wherein n are each independently 1 to 18.

For phenolic compounds of general formula (Z2) the abovementioned definition of $R^1$ likewise applies.

In preferred phenolic compounds of general formula (Z2) n takes the values 1 or 2.

$R^1$ is preferably located ortho to the indicated hydroxyl radical in the case of phenolic compounds of general formula (Z2) where n=1.

In the case of phenolic compounds of general formula (Z2) where n=2 the two radicals $R^1$ are both ortho and para to the indicated hydroxyl radical.

In phenolic compounds of general formula (Z2) B represents a bond, nitrogen or an alkyl group, preferably a 2,2-bond, or a 4,4-bond, or a 2,2-linking alkyl group or a 4,4-linking alkyl group, wherein alkyl can represent ($C_1$-$C_{24}$)-alkyl, in particular a linear or branched ($C_1$-$C_{12}$)-alkyl, particularly preferably a methylene, ethylidene, propylidene, isobutylidene or n-butylidene.

Preferred phenolic compounds of general formula (Z1) are for n=1: 4-ethylphenol, 2-isopropylphenol, 2-sec-butylphenol, 2-tert-butylphenol, 2-cyclohexylphenol, 2-n-dodecylphenol, 2-octylphenol, 2-n-decylphenol, 2-tert-amylphenol, 2-(1-methylnonyl)phenol, o-isononylphenol, o-(1-propylpentyl)phenol, o-hexadecylphenol, 3-tert-butylphenol, 3-n-pentylphenol, 3-n-pentadecylphenol, 3-cyclohexylphenol, 3-di-n-butylaminophenol, 3-(dibutylamino)phenol, 4-n-butylphenol, 4-sec-butylphenol, 4-tert-butylphenol, 4-n-pentylphenol, 4-(pentyloxy)phenol, 4-n-(hexyloxy)phenol, 4-n-hexylphenol, 4-(3-hydroxybutyl) phenol, 4-n-undecylphenol, 4-n-tridecylphenol, 4-n-octadecyloxyphenol, 4-n-hexadecyloxyphenol, p-hexadecylphenol, 4-(4-n-butylphenyl)phenol, 4-cyclohexylphenol, 4-sec-decylphenol, 4-n-decylphenol, 4-n-decyloxyphenol, 4-n-dodecyloxyphenol, 4-n-heptylphenol, 4-n-heptyloxyphenol, isododecylphenol, 4-(2,6-dimethylheptyl) phenol, p-(1,1-dimethylheptyl)phenol, 4-n-octylphenol, 4-sec-octylphenol, 4-tert-octylphenol, 4-(n-octyloxy)phenol, p-isooctylphenol, p-(1-ethylhexyl)phenol, 4-n-nonylphenol, 4-n-nonyloxyphenol, 4-butyloxyphenol, 4-n-butyloxyphenol, 4-[2-(butylamino)-1-hydroxyethyl]phenol, 4-butylaminophenol, 4-(trans-4-n-butylcyclohexyl)phenol, for n=2: 2-tert-butyl-4-methylphenol, 2-tert-butyl-4-ethylphenol, 2-tert-butyl-4-isopropylphenol, 2,4-di-tert-butylphenol, 2,4-di-sec-butylphenol, 2-sec-butyl-4-tert-butylphenol, 2,4-di-tert-amylphenol, 4-tert-butyl-2-methylphenol, 4-isobutyl-2-isopropylphenol, 4-tert-butyl-2-cyclopentylphenol, 2-tert-butyl-6-methylphenol, 2,6-di-tert-butylphenol, 2,6-di-sec-butylphenol, 2,6-di-isobutylphenol, 6-tert-butyl-2-methylphenol, 6-sec-butyl-2-cyclopentylphenol, 6-tert-butyl-3-methylphenol, 2,5-di-tert-butylphenol, 2-tert-butyl-5-methylphenol, 3,5-di-tert-butylphenol, 3,5-di-isobutylphenol, 4-methyl-6-tert-butylphenol, 2,4-di-tert-pentylphenol, 4-tert-butyl-2-cyclopentylphenol, 6-sec-butyl-2-cyclopentylphenol, 2,4-dipentylphenol, 5-methyl-2-n-pentylphenol, 2-bromo-4-(sec-butyl)phenol, 2-bromo-4-butylphenol, 2-bromo-4-tert-butylphenol, 4-tert-butyl-2-phenylphenol, 4-tert-butyl-2-chlorophenol, 4-tert-butyl-2-fluorophenol, 2-cyclohexyl-4-methylphenol, 2-cyclohexyl-5-methylphenol, 2,6-dicyclohexylphenol, 2,4-dioctylphenol, 2,3-dioctylphenol, 2,3-dinonylphenol, 4-butyl-2-nitrophenol, 4-tert-butyl-2-nitrophenol, 2-acetyl-4-butylaminophenol, 4-tert-butyl-2-aminophenol, 3-methyl-2-octylphenol, didodecylphenol, 2-nitro-4-tert-butylphenol, 2-cyclohexyl-4-nitrophenol, 2-tert-butyl-4-methoxyphenol, 2-isobutyl-5-methoxyphenol, 2-amino-4-tert-butylphenol, 2-amino-6-nitro-4-tert-butylphenol, 2-amino-4-sec-butylphenol, 2-amino-4-tert-butylphenol, 2-amino-p-tert-butylphenol, 5-amino-2-butylphenol, cyclohexyl-2-(2-phenylethyl)phenol, for n=3: 2,4,6-tri-tert-butylphenol, 2,4,6-tri-isobutylphenol, 2-tert-butyl-4,6-dimethylphenol, 2,4-dibutyl-6-ethylphenol, 2,4-dimethyl-6-tert-butylphenol, 2,4-dimethyl-6-(1'-methyl-heptadec-1'-yl)phenol, 2,6-di-tert-butylhydroyxytoluene (BHT), 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 4-sec-butyl-2,6-di-tert-butylphenol, 4-tert-butyl-2,6-dimethylphenol, 4-tert-butyl-2,6-dicyclopentylphenol, 4-tert-butyl-2,6-diisopropylphenol, 4,6-di-tert-butyl-2-methylphenol, 6-tert-butyl-2,4-dimethylphenol, tert-butyl-2,5-dimethylphenol, 2,5-di-tert-butyl-4-methylphenol, tri-sec-butylphenol, 2,6-di-tert-butyl-3-methylphenol, 4,6-di-tert-butyl-3-methylphenol, 2,4-di-tert-butyl-5-ethylphenol, 4-hydroxymethyl-2,6-di-tert-butylphenol, 2,6-di-tert-butyl-4-phenylphenol, 2,6-dioctadecyl-4-methylphenol, 2,4-dimethyl-6-(1'-methyl-tridec-1'-yl)phenol, 2-bromo-4,6-di(tert-butyl)phenol, 4-bromo-2,6-di-tert-butylphenol, 2,6-di-tert-butyl-4-chlorophenol, 2,4-dimethyl-6-r-methyl-undec-1'-yl) phenol, 2,6-di-tert-butyl-4-methoxyphenol, 2,3,4-trinonylphenol, 2,6-di-tert-butyl-4-nonylphenol, 2,6-di-tertbutyl-4-octylphenol, 2,4,6-tris(1-methyloctyl)phenol, 2,6-dinonyl-4-methylphenol, 2,6-dinitro-4-nonylphenol, 2,4,6-tricyclohexylphenol, 2,4-di-tert-butyl-6-nitrophenol, 2,6-di-tert-butyl-4-nitrophenol, 2-sec-butyl-4,6-dinitrophenol, 4-tert-butyl-2,6-dinitrophenol, 2,6-dinitro-4-tert-butylphenol, 4,6-dinitro-2-sec-butylphenol, 2,4,6-trioctylphenol, 2,6-di-tert-butyl-4-octylphenol, 2-hexyl-4,6-dinitrophenol, 2-isooctyl-4,6-dinitrophenol, 2,6-di-tert-butyl-4-methoxymethylphenol, 4-tert-butyl-2,6-dimethoxyphenol, 4-allyl-5-(tert-butyl)-2-methoxyphenol, 2,5-di-tert-butyl-4-methoxyphenol, N,N-di-n-butyl-3-aminophenol, 2-amino-4-tert-butyl-6-nitrophenol, 6-sec-butyl-2,4-diaminophenol, 2-amino-6-tert-butyl-4-methylphenol, 2-amino-4,6-di-tert-butylphenol, 3-amino-2,6-di-tert-butylphenol, bis(tert-butyl)dodecylphenol or 4-nonyl-2,6-bis(1-phenylethyl)phenol.

Particularly preferred phenolic compounds of general formula (Z1) are 2,4,6-tri-tert-butylphenol, 2,4,6-triisobutylphenol, 2-tert-butyl-4,6-dimethylphenol, 2,4-dibutyl-6-ethylphenol, 2,4-dimethyl-6-tert-butylphenol, 2,6-di-tert-butylhydroxytoluene (BHT), 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 4-tert-butyl-2,6-dimethylphenol, 4-tert-butyl-2,6-dicyclopentylphenol, 4-tert-butyl-2,6-diisopropylphenol, 4,6-di-tert-butyl-2-methylphenol, 6-tert-butyl-2,4-dimethylphenol, 2,6-di-tert-butyl-3-methylphenol, 4-hydroxymethyl-2,6-di-tert-butylphenol, 2,6-di-tert-butyl-4-phenylphenol and 2,6-dioctadecyl-4-methylphenol.

A very particularly preferred phenolic compound of general formula (Z1) is 2,6-di-tert-butylhydroxytoluene (obtainable as Vulkanox® BHT from LANXESS) or 2-methyl-4,6-bis((octylthio)methyl)phenol (obtainable as Irganox® 1520 from BASF).

Particularly preferred phenolic compounds of general formula (Z2) are
for 2,2'-linkages: 2,2'-ethylidene-bis[4,6-di-tert-butylphenol], 2,2'-ethylidene-bis[6-tert-butyl-4-isobutylphenol], 2,2'-isobutylidene-bis[4,6-dimethylphenol], 2,2'-methylene-bis[4,6-di-tert-butylphenol], 2,2'-methylene-bis[4-methyl-6-(α-methylcyclohexyl)phenol], 2,2'-methylene-bis[4-methyl-6-cyclohexylphenol], 2,2'-methylene-bis[4-methyl-6-nonylphenol], 2,2'-methylene-bis[6-(α,α'-dimethylbenzyl)-4-nonylphenol], 2,2'-methylene-bis[6-(α-methylbenzyl)-4-nonylphenol], 2,2'-methylene-bis[6-cyclohexyl-4-methylphenol], 2,2'-methylene-bis[6-tert-butyl-4-ethylphenol], 2,2'-methylene-bis[6-tert-butyl-4-methylphenol],
for 4,4-linkages: 4,4'-butylidene-bis[2-tert-butyl-5-methylphenol], 4,4'-methylene-bis[2,6-di-tert-butylphenol], 4,4'-methylene-bis[6-tert-butyl-2-methylphenol], 4,4'-isopropylidenediphenol, 4,4'-decylidenebisphenol, 4,4'-dodecylidenebisphenol, 4,4'-(1-methyloctylidene)bisphenol, 4,4'-cyclohexylidenebis(2-methylphenol) or 4,4'-cyclohexylidenebisphenol.

A very particularly preferred phenolic compound of general formula (Z2) is 2,2'-methylene-bis[6-tert-butyl-4-methylphenol] (obtainable as Vulkanox® BKF from LANXESS).

Further very particularly preferred phenolic compounds of general formulal (Z1) or (Z2) are selected from the group consisting of 2,2'-methylene-bis-(4-methyl-6-tert-butylphenol) (Vulkanox® BKF), 2,6-di-tert-butyl-4-methylphenol (Vulkanox® BHT), octadecyl-3-(3,5-di-tert-butyl-4-hydroxyphenyl) (Irganox® 1076), 2-methyl-4,6-bis((octylthio)methyl)phenol (Irganox® 1520), 2,2'-methylenebis(4-methyl-6-nonylphenol) (Naugawhite®), phenol, 2,2'-bisphenol and bis-(4-hydroxyphenyl)methane.

Nitrile-Butadiene Rubber

Nitrile rubbers ("NBR") employable in the process according to the invention include copolymers, terpolymers or quaterpolymers containing repeating units of at least one conjugated diene, at least one α,β-unsaturated nitrile and optionally one or more further copolymerizable monomers.

Any conjugated diene can be used. It is preferable to employ conjugated ($C_4$-$C_6$)-dienes. Particular preference is given to 1,3-butadiene, isoprene, 2,3-dimethylbutadiene, piperylene or mixtures thereof. 1,3-butadiene and isoprene or mixtures thereof are especially preferred. 1,3-Butadiene is very particularly preferred.

Employable as the α,β-unsaturated nitrile are any known α,β-unsaturated nitrile, preference being given to ($C_3$-$C_5$)-α,β-unsaturated nitriles such as acrylonitrile (ACN), methacrylonitrile, ethacrylonitrile or mixtures thereof. Particular preference is given to acrylonitrile.

A copolymer of acrylonitrile and 1,3-butadiene is thus a particularly preferred nitrile rubber.

Also employable in addition to the conjugated diene and the α,β-unsaturated nitrile are one or more further copolymerizable monomers known to those skilled in the art, for example α,β-unsaturated monocarboxylic or dicarboxylic acids or esters or amides thereof.

Preferred α,β-unsaturated monocarboxylic or dicarboxylic acids are fumaric acid, maleic acid, acrylic acid and methacrylic acid.

Employed as esters of α,β-unsaturated carboxylic acids are
alkyl esters, especially $C_1$-$C_{18}$-alkyl, preferably n-butyl, tert-butyl, n-pentyl or n-hexyl (meth)acrylate;
alkoxyalkyl esters, especially $C_1$-$C_{18}$-alkoxyalkyl, preferably $C_4$-$C_{12}$-alkoxyalkyl (meth)acrylate;
hydroxyalkyl esters, especially $C_1$-$C_{18}$-hydroxyalkyl, preferably $C_4$-$C_{12}$-hydroxyalkyl (meth)acrylate;
cycloalkyl esters, especially $C_5$-$C_{18}$-cycloalkyl (meth)acrylate, preferably $C_6$-$C_{12}$-cycloalkyl (meth)acrylate, particularly preferably cyclopentyl (meth)acrylate, cyclohexyl (meth)acrylate, cycloheptyl (meth)acrylate;
alkylcycloalkyl esters, especially $C_6$-$C_{12}$ alkylcycloalkyl, preferably $C_7$-$C_{10}$ alkylcycloalkyl, particularly preferably methylcyclopentyl (meth)acrylate and ethylcyclohexyl (meth)acrylate;
aryl esters, especially $C_6$-$C_{14}$-aryl monoesters, preferably phenyl (meth)acrylate or benzyl (meth)acrylate;
amino-containing esters α,β-ethylenically unsaturated carboxylic esters such as for example dimethylaminomethyl acrylate or diethylaminoethyl acrylate;
α,β-ethylenically unsaturated dicarboxylic acid monoalkyl esters, preferably
alkyl, especially $C_4$-$C_{18}$-alkyl, preferably n-butyl, tert-butyl, n-pentyl or n-hexyl, particularly preferably mono-n-butyl maleate, mono-n-butyl fumarate, mono-n-butyl citraconate, mono-n-butyl itaconate, very particularly preferably mono-n-butyl maleate;
alkoxyalkyl, especially $C_4$-$C_{18}$-alkoxyalkyl, preferably $C_4$-$C_{12}$-alkoxyalkyl,
hydroxyalkyl, especially $C_4$-$C_{18}$-hydroxyalkyl, preferably $C_4$-$C_{12}$-hydroxyalkyl,
cycloalkyl, especially $C_5$-$C_{18}$-cycloalkyl, preferably $C_6$-$C_{12}$-cycloalkyl, particularly preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate, alkylcycloalkyl, especially $C_6$-$C_{12}$-alkylcycloalkyl, preferably $C_7$-$C_{10}$ alkylcycloalkyl, particularly preferably monomethylcyclopentyl maleate monoethylcyclohexyl fumarate, monomethylcyclopentyl citraconate and monoethylcyclohexyl citraconate, monomethylcyclopentyl itaconate and monoethylcyclohexyl itaconate;

aryl, especially $C_6$-$C_{14}$-aryl monoesters, preferably monoaryl maleate, monoaryl fumarate, monoaryl citraconate or monoaryl itaconate, particularly preferably monophenyl maleate or monobenzyl maleate, monophenyl fumarate or monobenzyl fumarate, monophenyl citraconate or monobenzyl citraconate, monophenyl itaconate or monobenzyl itaconate, unsaturated polyalkyl polycarboxylates, for example dimethyl maleate, dimethyl fumarate, dimethyl itaconate or diethyl itaconate.

Mixtures of the abovementioned esters are also employable.

Preferably employed esters of the α,β-unsaturated carboxylic acids are the alkyl esters and alkoxyalkyl esters thereof. Particularly preferred alkyl esters of α,β-unsaturated carboxylic acids are methyl acrylate, ethyl acrylate, butyl acrylate, butyl methacrylate, 2-ethyl hexylacrylate, 2-ethylhexyl methacrylate and octyl acrylate. Particularly preferred alkoxyalkyl esters of α,β-unsaturated carboxylic acids are methoxyethyl (meth)acrylate and ethoxyethyl (meth)acrylate. Also employed as preferable α,β-ethylenically unsaturated carboxylic esters are PEG acrylates derived from general formula (I)

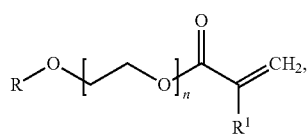

formula (I)

wherein

R is branched or unbranched $C_1$-$C_{20}$-alkyl, preferably $C_2$-$C_{20}$-alkyl, particularly preferably ethyl, butyl or ethylhexyl, n is 2 to 12, preferably 2 to 8, particularly preferably 2 to 5 and very particularly preferably 2 or 3 and $R^1$ is hydrogen or $CH_3$—.

In the context of the present invention the term "(meth) acrylate" represents "acrylate" and "methacrylate". When the radical $R^1$ in general formula (I) is $CH_3$— a methacrylate is concerned.

In the context of the present invention the term "polyethylene glycol" or the abbreviation "PEG" represents ethylene glycol sections having two ethylene glycol repeating units (PEG-2; n=2) to 12 ethylene glycol repeating units (PEG-2 to PEG-12; n=2 to 12).

The term "PEG acrylate" is also abbreviated to PEG-X-(M)A wherein "X" represents the number of repeating ethylene glycol units, "MA" stands for methacrylate and "A" stands for acrylate.

In the context of the present invention acrylate units derived from PEG acrylates of general formula (I) are referred to as "PEG acrylate unit".

Preferred PEG acrylate units are derived from the PEG acrylates of formulae 1 to 8 which follow, wherein n=2, 3, 4, 5, 6, 7, 8, 9, 10, 11 or 12, preferably 2, 3, 4, 5, 6, 7 or 8, particularly preferably 2, 3, 4 or 5 and very particularly preferably 2 or 3:

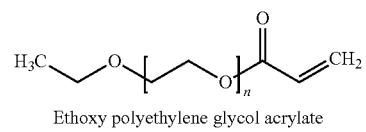

(Formula no. 1)

Ethoxy polyethylene glycol acrylate

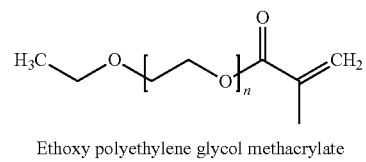

(Formula no. 2)

Ethoxy polyethylene glycol methacrylate

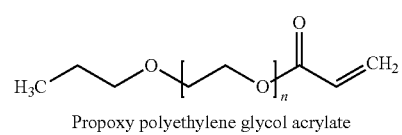

(Formula no. 3)

Propoxy polyethylene glycol acrylate

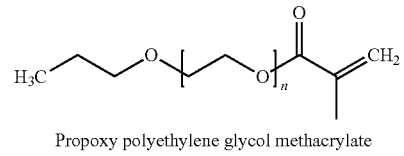

(Formula no. 4)

Propoxy polyethylene glycol methacrylate

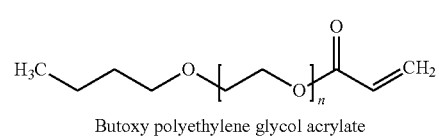

(Formula no. 5)

Butoxy polyethylene glycol acrylate

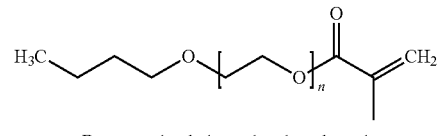

(Formula no. 6)

Butoxy polyethylene glycol methacrylate

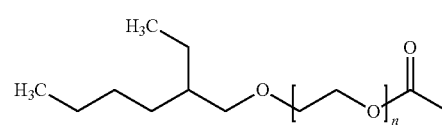

(Formula no. 7)

Ethylhexyloxy polyethylene glycol acrylate

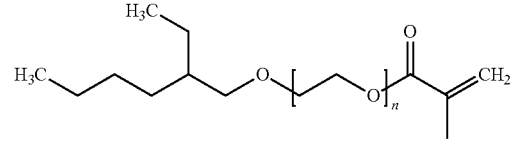

(Formula no. 8)

Ethylhexyloxy polyethylene glycol methacrylate

Other commonly used designations for ethoxy polyethylene glycol acrylate (formula no. 1) are for example poly (ethylene glycol) ethyl ether acrylate, ethoxy-PEG acrylate, ethoxy poly(ethylene glycol) monoacrylate or poly(ethylene glycol) monoethyl ether monoacrylate.

These PEG acrylates are commercially available, for example from Arkema under the trade name Sartomer®, from Evonik under the trade name Visiomer® or from Sigma Aldrich.

In a preferred embodiment the amount of PEG acrylate units in the nitrile rubber is in the range from 0% to 65% by weight, preferably 20% to 60% by weight and particularly preferably 20% to 55% by weight based on the total amount of 100% by weight of all monomer units.

In an alternative embodiment the amount of PEG acrylate units in the nitrile rubber is 20% to 60% by weight and the amount of further α,β-ethylenically unsaturated carboxylic esters units distinct from the PEG acrylate units is 0% to 40% by weight based on the total amount of 100% by weight of all monomer units, wherein the total amount of carboxylic esters units does not exceed 60% by weight.

In an alternative embodiment, the nitrile rubber contains not only the α,β-ethylenically unsaturated nitrile unit, the conjugated diene unit and the PEG acrylate unit derived from a PEG acrylate of general formula (I) as an unsaturated carboxylic ester unit but also a dicarboxylic acid monoalkyl ester unit, preferably monobutyl maleate.

In a preferred nitrile rubber the α,β-ethylenically unsaturated nitrile unit is derived from acrylonitrile or methacrylonitrile, particularly preferably from acrylonitrile, the conjugated diene unit is derived from isoprene or 1,3-butadiene, particularly preferably from 1,3-butadiene, and the α,β-ethylenically unsaturated carboxylic ester unit is exclusively a PEG acrylate unit derived from PEG acrylate of general formula (I), wherein n is 2 to 8, particularly preferably from PEG acrylate of general formula (I) where n is 2 or 3, wherein no further carboxylic ester unit is present.

In a further preferred nitrile rubber the α,β-ethylenically unsaturated nitrile unit is derived from acrylonitrile or methacrylonitrile, particularly preferably from acrylonitrile, the conjugated diene unit is derived from isoprene or 1,3-butadiene, particularly preferably from 1,3-butadiene, and the α,β-ethylenically unsaturated carboxylic ester unit is derived from a first PEG acrylate of general formula (I), wherein n is 2 to 12, particularly preferably from PEG acrylate of general formula (I) where n is 2 or 3 and an α,β-ethylenically unsaturated carboxylic ester unit distinct from the PEG acrylate units.

In addition, the nitrile rubber may contain one or more further copolymerizable monomers in an amount of 0% by weight to 20% by weight, preferably 0.1% by weight to 10% by weight, based on the total amount of 100% by weight of all monomer units. The amounts of the other monomer units are then suitably reduced to ensure that all monomer units always sum to 100% by weight. The nitrile rubber may contain as further copolymerizable monomers one or more

- aromatic vinyl monomers, preferably styrene, α-methylstyrene and vinylpyridine,
- fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else
- α-olefins, preferably $C_2$-$C_{12}$ olefins, for example ethylene, 1-butene, 4-butene, 4-methyl-1-pentene, 1-hexene or 1-octene,
- non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicyclopentadiene or else
- alkynes such as 1- or 2-butyne,
- α,β-ethylenically unsaturated monocarboxylic acids, preferably acrylic acid, methacrylic acid, crotonic acid or cinnamic acid,
- α,β-ethylenically unsaturated dicarboxylic acids, preferably maleic acid, fumaric acid, citraconic acid, itaconic acid,
- copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or
- crosslinkable monomers, for example divinyl components such as for example divinylbenzene.

In an alternative embodiment the nitrile rubber contains as PEG acrylate units ethoxy, butoxy or ethylhexyloxy polyethylene glycol (meth)acrylate comprising 2 to 12 ethylene glycol repeating units, particularly preferably ethoxy or butoxy polyethylene glycol (meth)acrylate comprising 2 to 5 ethylene glycol repeating units and very particularly preferably ethoxy or butoxy polyethylene glycol (meth) acrylate comprising 2 or 3 ethylene glycol repeating units.

In a further alternative embodiment of the nitrile rubber n is 2 oder 3, R is ethyl or butyl and $R^1$ is hydrogen or methyl, preferably n is 2, R is butyl and $R^1$ is methyl.

In a further alternative embodiment the nitrile rubber comprises 8% to 18% by weight of acrylonitrile units, 27% to 65% by weight of 1,3-butadiene units and 27% to 55% by weight of PEG-2 acrylate units or PEG-3 acrylate units.

In a further alternative embodiment the nitrile rubber contains

- 13% to 17% by weight of α,β-ethylenically unsaturated nitrile unit, preferably acrylonitrile,
- 36% to 44% by weight of the conjugated diene unit, preferably 1,3-butadiene, and
- 43% to 47% by weight of PEG acrylate unit derived from a PEG acrylate of general formula (I), preferably butoxydiethylene glycol methacrylate.

The proportions of conjugated diene and α,β-unsaturated nitrile in the NBR polymers to be employed may be varied over wide ranges. The proportion of the or of the sum of the conjugated diene(s) is typically in the range from 40% to 90% by weight, preferably in the range from 55% to 85% by weight based on overall polymer. The proportion of the or of the sum of the α,β-unsaturated nitriles is typically 10% to 60% by weight, preferably 15% to 45% by weight, based on the overall polymer. The proportions of the monomers in each case sum to 100% by weight. The additional monomers may be present in amounts of 0% to 40% by weight, preferably 0.1% to 65% by weight, particularly preferably 1% to 30% by weight, based on the overall polymer. In this case corresponding proportions of the conjugated diene(s) and/or of the α,β-unsaturated nitrile(s) are replaced by the proportions of the additional monomers, the proportions of all monomers summing to 100% by weight in each case.

The production of the nitrile rubbers by polymerization of the abovementioned monomers is well known to those skilled in the art and extensively described in the literature (for example from W. Hofmann, Rubber Chem. Technol. 36 (1963)).

Nitrile rubbers employable in the context of the present invention are also commercially available, for example as products from the Perbunan® and Krynac® product ranges from ARLANXEO Deutschland GmbH.

The nitrile rubbers used for metathesis have a Mooney viscosity (ML 1+4 at 100° C.) in the range from 30 to 100, preferably from 30 to 50. This corresponds to a weight-average molecular weight Mw in the range from 150 000 g/mol to 500 000 g/mol, preferably in the range from 180 000 g/mol to 400 000 g/mol. The employed nitrile rubbers further have a polydispersity PDI=Mw/Mn, wherein Mw is the weight-average molecular weight and Mn is the number-average molecular weight, in the range from 2.0 to 8.0 and preferably in the range from 2.0 to 6.0.

The Mooney viscosity is determined according to ASTM Standard D 1646.

The nitrile rubbers obtained by the metathesis process according to the invention contain an amount of phenolic compound of 0.0001 phr to 5 phr, preferably 0.001 phr to 2 phr, particularly preferably 0.05 to 1.0 phr, based on the total amount of nitrile rubber The nitrile rubbers obtained by the metathesis process according to the invention have a Mooney viscosity (ML 1+4 at 100° C.) of 5 to 35, preferably of 5 to 25, Mooney units. This corresponds to a weight-average molecular weight Mw in the range from 10 000 g/mol to 150 000 g/mol, preferably in the range from 10 000 g/mol to 100 000 g/mol. The nitrile rubbers obtained further have a polydispersity PDI=Mw/Mn, wherein Mn is the number-average molecular weight, in the range from 1.4 to 4.0, preferably in the range from 1.5 to 3.0.

The present invention accordingly further provides a process for reducing the molecular weight of nitrile rubbers, wherein nitrile rubber is subjected to a metathesis reaction in the presence of a complex catalyst system according to the invention. The metathetic degradation in the presence of the catalyst system according to the invention may be followed by a hydrogenation of the obtained degraded nitrile rubbers. This can be effected in a manner known to those skilled in the art.

It is possible to perform the hydrogenation using homogeneous or heterogeneous hydrogenation catalysts. It is also possible to perform the hydrogenation in situ, i.e. in the same reaction mixture in which the metathesis degradation was also carried out previously and with no need to isolate the degraded nitrile rubber. The hydrogenation catalyst is simply added to the reaction vessel.

The employed catalysts are typically based on rhodium, ruthenium or titanium, but it is also possible to use platinum, iridium, palladium, rhenium, ruthenium, osmium, cobalt or copper, either as the metal or else preferably in the form of metal compounds (see, for example, U.S. Pat. No. 3,700,637, DE-A-25 39 132, EP-A-0 134 023, DE-OS-35 41 689, DE-OS-35 40 918, EP-A-0 298 386, DE-OS-35 29 252, DE-OS-34 33 392, U.S. Pat. Nos. 4,464,515 and 4,503,196).

Suitable catalysts and solvents for a hydrogenation in the homogeneous phase are described hereinbelow and are also known from DE-A-2539132 and EP-A-0471250.

Selective hydrogenation may for example be achieved in the presence of a rhodium or ruthenium catalyst. Employable catalysts include for example a catalyst of general formula

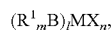

wherein M is ruthenium or rhodium, $R^1$ is identical or different and represents a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulfur or a sulfoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulfoxide)rhodium(III) chloride and also tetrakis(triphenylphosphine)rhodium hydride of formula $(C_6H_5)_3P_4RhH$ and the corresponding compounds in which the triphenylphosphine has been entirely or partially replaced by tricyclohexylphosphine. The catalyst may be used in small amounts. Amounts in the range from 0.01% to 1% by weight, preferably in the range from 0.03% to 0.5% by weight and particularly preferably in the range from 0.05% to 0.3% by weight based on the weight of the polymer are suitable.

It is typically advantageous to use the catalyst together with a co-catalyst which is a ligand of formula $R^1mB$, wherein $R^1$, m and B are as defined hereinabove for the catalyst. It is preferable when m is 3, B is phosphorus and the radicals $R^1$ may be the same or different. The co-catalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of co-catalysts may be found in U.S. Pat. No. 4,631,315 for example. A preferred co-catalyst is triphenylphosphine. In addition, the weight ratio of the rhodium catalyst to the co-catalyst is preferably in the range from 1:1 to 1:55, particularly preferably in the range from 1:3 to 1:30. Based on 100 parts by weight of the nitrile rubber to be hydrogenated, use is suitably made of 0.1 to 33 parts by weight of the co-catalyst, preferably 0.2 part by weight to 20 parts by weight and very particularly preferably 0.5 to 5 parts by weight, especially more than 0.9 part by weight but less than 5 parts by weight of co-catalyst based on 100 parts by weight of the nitrile rubber to be hydrogenated.

The practical performance of this hydrogenation is well-known to those skilled in the art from U.S. Pat. No. 6,683,136. It is typically carried out by contacting the nitrile rubber to be hydrogenated with hydrogen in a solvent such as toluene or monochlorobenzene for 2 to 10 h at a temperature in the range from 100° C. to 150° C. and a pressure in the range from 5 MPa to 15 MPa.

In the context of the present invention hydrogenation is to be understood as meaning a conversion of the double bonds present in the starting nitrile rubber to an extent of at least 50%, preferably 70% to 100%, particularly preferably 80% to 100%. Residual double bond contents in the HNBR of 0% to 8% are also particularly preferred.

When using heterogeneous catalysts these are typically supported catalysts based on palladium which are supported on charcoal, silica, calcium carbonate or barium sulfate for example.

On completion of the hydrogenation a hydrogenated nitrile rubber having a Mooney viscosity (ML 1+4 @ 100° C.) measured according to ASTM Standard D 1646 in the range from 1 to 50 is obtained. This corresponds approximately to a weight-average molecular weight Mw in the range from 2000 to 400 000 g/mol. The Mooney viscosity (ML 1+4 @100° C.) is preferably in the range from 5 to 40. This corresponds approximately to a weight-average molecular weight Mw in the range from about 20 000 to 200 000 g/mol. The obtained hydrogenated nitrile rubbers further have a polydispersity PDI=Mw/Mn, wherein Mw is the weight-average molecular weight and Mn is the number-average molecular weight, in the range from 1 to 5 and preferably in the range from 1.5 to 3.

EXAMPLES

Materials Employed

The metathesis reactions (molecular weight degradation reactions) described in the following test series were performed using a nitrile rubber having the following characteristics: Acrylonitrile content: 34.3% by weight; Mooney viscosity (ML 1+4 @100° C.): 33 Mooney units; residual moisture: 1.0% by weight.

| Metathesis catalysts | |
|---|---|
| Grubbs II catalyst | Benzylidene[1,3-bis(2,4,6-trimethylphenyl)-2-imidazolidinylidene]dichloro(tricyclohexyl-phosphine)ruthenium ($C_{46}H_{65}Cl_2N_2PRu$; M = 848.97 g/mol) (Umicore) |
| Grubbs III catalyst | [1,3-Bis(2,4,6-trimethylphenyl)-2-imidazolidinylidene]dichloro(phenylmethylene)bis(3-bromopyridine)ruthenium(II) ($C_{38}H_{40}Br_2Cl_2N_4Ru$; M = 884.54 g/mol); (Umicore) |
| Grubbs-Hoveyda II catalyst | 1,3-Bis(2,4,6-trimethylphenyl)-2-imidazolidinylidene)dichloro(o-isopropoxyphenylmethylene)ruthenium ($C_{31}H_{38}Cl_2N_2ORu$; M = 626.62 g/mol) (Umicore) |
| M41 catalyst | [1,3-Bis(2,4,6-trimethylphenyl)-2-imidazolidinylidene]chloro[2-[[(4-methylphenyl)imino]methyl]-4-nitrophenolato](3-phenyl-1H-inden-1-ylidene)ruthenium ($C_{50}H_{47}ClN_4O_3Ru$; M = 888.46 g/mol) (Umicore) |
| Grela catalyst | 1,3-Bis(2,4,6-trimethylphenyl)-2-imidazolidinylidene)(2-isopropoxy-5-nitrobenzyliden)ruthenium(VI)chloride ($C_{31}H_{37}Cl_2N_3O_3Ru$; M = 671.62 g/mol) (Apeiron) |
| Fluorenylidene K2 catalyst | Dichloro(fluorenylidene)(1,3-dimesityldihydroimidazolylidene)(triphenyl-phosphino)ruthenium ($C_{52}H_{49}Cl_2N_2PRu$; M = 904.92 g/mol; prepared according to DE-A-102007039695) |

| Phenolic compounds | |
|---|---|
| Vulkanox® BKF | 2,2'-Methylene-bis(4-methyl-6-tert-butylphenol); (M = 340.6 g/mol; CAS-No.: 000119-47-1; $C_{23}H_{32}O_2$) (LANXESS) |
| Vulkanox® BHT | 2,6-Di-tert-butyl-4-methylphenol (M = 220.4 g/mol; CAS-No.: 000128-37-0; $C_{15}H_{24}O$) (LANXESS) |
| Irganox® 1076 | Octadecyl 3-(3,5-di-tert-butyl-4-hydroxyphenyl) (M = 530.86 g/mol; CAS-No.: 2082-79-3; $C_{35}H_{62}O_3$) (BASF) |
| Irganox® 1520 | 2-Methyl-4,6-bis((octylthio)methyl)phenol (M = 424.75 g/mol; CAS-No.: 110553-27-0; $C_{25}H_{44}OS_2$) (BASF) |
| Naugawhite® | 2,2'-Methylenebis(4-methyl-6-nonylphenol) (M = 480.76 g/mol; CAS-No.: 7786-17-6; $C_{33}H_{52}O_2$) (Addivant) |
| Phenol | Hydroxybenzene (M = 94.11 g/mol; CAS-No.: 108-95-2; $C_6H_5OH$) (Merck Millipore) |
| 2,2'-Bisphenol | Bis(2-hydroxyphenyl)methane (M = 200.24 g/mol; CAS-No.: 1333-16-0; $C_{13}H_{12}O_2$) (Sigma Aldrich) |
| Bisphenol F | Bis(4-hydroxyphenyl)methane (M = 200.24 g/mol; CAS-No.: 620-92-8; $C_{13}H_{12}O_2$) (Sigma Aldrich) |

Determination of Molecular Weight

The molecular weights obtained in the metathesis degradation reaction were determined by gel permeation chromatography (GPC). Before performing the GPC analysis the solutions were in each case filtered using a 0.2 μm syringe filter made of Teflon (Chromafil PTFE 0.2 mm; Machery-Nagel). This was followed by GPC analysis using a Waters 510 instrument. Analysis employed a combination of a pre-column (PL Guard from Polymer Laboratories) and 2 Resipore columns (300×7.5 mm, pore size 3 μm) from Polymer Laboratories. Calibration of the columns was carried out with linear polystyrene having molar masses of 960 to 6×105 g/mol from Polymer Standards Services. The detector used was a Waters RI detector (Waters 410 Differential Refractometer). Analysis was performed at a flow rate of 1.0 mL/min at 80° C. using N,N'-dimethylacetamide as eluent. Evaluation of the GPC curves was carried out with software from Polymers Laboratories (Cirrus Multi Version 3.0).

Purification According to Protocol 1

30 g of NBR were dissolved in 270 mL of toluene and the obtained solution was poured into a beaker filled with 700 mL of methanol with stirring over 3 minutes. The methanol from the thus-precipitated material was squeezed out on an aluminum plate and the solid was redissolved in 270 ml of toluene on a laboratory shaker. Precipitation was repeated twice. After the third reprecipitation the material was dissolved in toluene, optionally admixed with the relevant phenolic compound and the toluene removed at 60° C. using a rotary evaporator (10 mbar, about 30 minutes). In order to remove residual methanol entirely the solid was dissolved in 500 g of monochlorobenzene (MCB) and concentrated to afford a 10% solution using a rotary evaporator. The solution was employed directly in the metathesis.

Purification According to Protocol 2

30 g of NBR were dissolved in 270 mL of toluene and the obtained solution was poured into a beaker filled with 700 mL of methanol with stirring over 3 minutes. The methanol from the thus-precipitated material was squeezed out on an aluminum plate and the solid was redissolved in 270 ml of toluene on a laboratory shaker. Precipitation was repeated twice. The relevant phenolic compound was added to a solution of the precipitated material before methanol and toluene were removed. After the third reprecipitation the material was dried to a constant mass in a Teflon-coated bowl at room temperature in a vacuum drying cabinet. Analysis revealed a residual methanol content of 20 ppm. The material was employed directly in the metathesis.

Preparation of the Catalyst Solution for the Metathesis with Metathesis Catalyst A fresh batch of catalyst solution was made up before each experiment. In a 100 mL Schlenk flask 25 mL of MCB were degassed and inertized with argon three times. The relevant amounts of metathesis catalyst were added under an argon countercurrent and the obtained solution was once again degassed and inertized with argon to ensure a complete absence of oxygen.

Metathesis of NBR without Addition Vs. with Addition of Vulkanox® BKF

In a 250 mL Schlenk flask fitted with a reflux cooler and a magnetic stirrer 5 g of the NBR purified according to protocol 1 were dissolved in 45 g of MCB (10% solution) and the obtained solution was degassed and inertized with argon. 8 phr of 1-dodecene were added countercurrently and the solution optionally brought to reaction temperature. 0.5 mL of the fresh catalyst solution were added, corresponding to an amount of 0.005 phr/29 μmol of Grubbs II catalyst. The reaction mixture was stirred at 20° C./60° C. for 4 hours. Respective 2 mL samples were removed after reaction times of 30, 60, 120 and 240 minutes and, in a screw top vial, reacted with 0.5 mL of ethyl vinyl ether to terminate the metathesis reaction. The samples were analyzed by GPC. The results are shown in tables 1.1 to 1.4.

Tables 1.1-1.4. Metathesis of NBR with 0.005 Phr of Grubbs II Catalyst with and without Addition of 0.11 Phr of Phenolic Compound (Vulkanox® BKF) at 20° C. and 60° C. ($M_W{''}$=Normalized to Initial Molecular Weight)

TABLE 1.1

| 20° C.; without addition | | | | |
|---|---|---|---|---|
| t [min] | Mn | Mw | PDI | $M_W{''}$ |
| 0 | 85.876 | 254.612 | 3.0 | 1.00 |
| 30 | 79.806 | 236.365 | 3.0 | 0.93 |
| 60 | 78.630 | 232.389 | 3.0 | 0.91 |

TABLE 1.1-continued

| 20° C.; without addition | | | |
|---|---|---|---|
| t [min] | Mn | Mw | PDI | $M_W^n$ |
| 120 | 77.935 | 232.538 | 3.0 | 0.91 |
| 240 | 77.108 | 229.745 | 3.0 | 0.90 |

TABLE 1.2

| 60° C.; without addition | | | |
|---|---|---|---|
| Mn | Mw | PDI | $M_W^n$ |
| 85.876 | 254.612 | 3.0 | 1.00 |
| 77.874 | 225.693 | 2.9 | 0.89 |
| 78.090 | 225.603 | 2.9 | 0.89 |
| 78.124 | 228.213 | 2.9 | 0.90 |
| 77.793 | 230.679 | 3.0 | 0.91 |

For metathesis reactions without addition of phenolic compounds only a very low degradation of the molecular weight (Mw) is observed both at low temperatures of 20° C. (table 1.1) and at high temperatures of 60° C. (table 1.2).

TABLE 1.3

| 20° C.; with addition | | | | |
|---|---|---|---|---|
| t [min] | Mn | Mw | PDI | $M_W^n$ |
| 0 | 84.100 | 258.017 | 3.1 | 1.00 |
| 30 | 77.015 | 224.554 | 2.9 | 0.87 |
| 60 | 72.366 | 201.865 | 2.8 | 0.78 |
| 120 | 62.638 | 158.428 | 2.5 | 0.61 |
| 240 | 29.912 | 61.908 | 2.1 | 0.24 |

TABLE 1.4

| 60° C.; with addition | | | |
|---|---|---|---|
| Mn | Mw | PDI | $M_W^n$ |
| 84.100 | 25.8017 | 3.1 | 1.00 |
| 29.880 | 61.533 | 2.1 | 0.24 |
| 29.912 | 61.287 | 2.0 | 0.24 |
| 29.925 | 61.203 | 2.0 | 0.24 |
| 29.803 | 61.055 | 2.0 | 0.24 |

Addition of 0.11 phr of phenolic compound (Vulkanox® BKF; table 1.3 and 1.4) results in a substantially greater degradation of the molecular weight (Mw) than in the case of metathesis reactions without addition of phenolic compounds (tables 1.1 and 1.2).

The metathesis reaction proceeds faster at 60° C. (table 1.4) than at 20° C. (table 1.3).

In a 250 mL Schlenk flask fitted with a reflux cooler and a magnetic stirrer 5 g of the NBR purified according to protocol 2 were dissolved in 45 g of MCB (10% solution) and the obtained solution was degassed and inertized with argon. 8 phr of 1-dodecene were added countercurrently and the solution optionally brought to reaction temperature. 0.5 mL of the fresh catalyst solution was added, corresponding to an amount of 0.005 phr/29 μmol of Grubbs II catalyst. The reaction mixture was stirred for 4 hours at 20° C. Respective 2 mL samples were removed after reaction times of 30, 60, 120 and 240 minutes and, in a screw top vial, reacted with 0.5 mL of ethyl vinyl ether to terminate the metathesis reaction. The samples were analyzed by GPC. The results are shown in tables 1.5 and 1.6.

Tables 1.5-1.6. Metathesis of NBR with 0.005 Phr of Grubbs II Catalyst with and without Addition of 0.11 Phr of Phenolic Compound (Vulkanox® BKF) at 20° C. (Pure Material Dried Overnight at Room Temperature in HV Drying Cabinet, 20 ppm MeOH):

TABLE 1.5

| 20° C.; without addition | | | | |
|---|---|---|---|---|
| t [min] | Mn | Mw | PDI | $M_W^n$ |
| 0 | 90.326 | 306.395 | 3.4 | 1 |
| 30 | 84.076 | 269.406 | 3.2 | 0.88 |
| 60 | 84.451 | 268.663 | 3.2 | 0.88 |
| 120 | 83.579 | 270.823 | 3.2 | 0.88 |
| 240 | 85.242 | 276.162 | 3.2 | 0.90 |

TABLE 1.6

| 20° C.; with addition | | | |
|---|---|---|---|
| Mn | Mw | PDI | $M_W^n$ |
| 90.326 | 306.395 | 3.4 | 1 |
| 84.829 | 275.479 | 3.2 | 0.90 |
| 80.841 | 247.189 | 3.1 | 0.81 |
| 66.941 | 187.027 | 2.8 | 0.61 |
| 55.856 | 139.043 | 2.5 | 0.45 |

Irrespective of the method of purification of the NBR intensified degradation of the molecular weight (Mw) occurs only when the catalyst system contains not only the metathesis catalyst (Grubbs II catalyst) but also at least one phenolic compound (Vulkanox® BKF).

Metathesis of NBR with Different Amounts of Added Vulkanox® BKF

In a 250 mL Schlenk flask fitted with a reflux cooler and a magnetic stirrer 5 g of the NBR purified according to protocol 1 and admixed with Vulkanox® BKF were dissolved in 45 g of MCB and the obtained solution degassed and inertized with argon. The added amounts of Vulkanox® BKF are shown in table 2 below. 8 phr of 1-dodecene and 0.5 ml of the fresh catalyst solution (corresponding to 0.005 phr/0.29 μmol of Grubbs II catalyst) were added countercurrently. The reaction mixture was stirred for 4 hours. Respective 2 mL samples were removed after reaction times of 30, 60, 120 and 240 minutes and, in a screw top vial, reacted with 0.5 mL of ethyl ether to terminate the metathesis reaction. The samples were analyzed by GPC. For comparison a sample of the non-pre-treated NBR was reacted with the catalyst under identical conditions. The ratio of nitrile groups in the nitrile rubber to phenolic compound (Vulkanox® BKF) is shown as CN/BKF.

TABLE 2

Metathesis of NBR with Grubbs II catalyst (0.005 phr) and different amounts of Vulkanox ® BKF ($Mw^n$ = normalized to initial molecular weight)

| No. | NBR [m/g] | Grubbs II [n/μmol] | Vulkanox ® BKF [phr] | Vulkanox ® BKF [μmol] | BKF/Grubbs II [mol/mol] | CN/BKF [mol/mol] |
|---|---|---|---|---|---|---|
| 2.1 | 5 | 0.29 | 0.22 | 32.30 | 111 | 1.000 |
| 2.2 | 5 | 0.29 | 0.04 | 5.87 | 20 | 5.000 |
| 2.3 | 5 | 0.29 | 0.02 | 2.94 | 10 | 10.000 |

TABLE 2-continued

Metathesis of NBR with Grubbs II catalyst (0.005 phr) and different amounts of Vulkanox ® BKF ($Mw^n$ = normalized to initial molecular weight)

| No. | NBR [m/g] | Grubbs II [n/μmol] | Vulkanox ® BKF [phr] | BKF/Grubbs II [μmol] | CN/BKF [mol/mol] | [mol/mol] |
|---|---|---|---|---|---|---|
| 2.4 | 5 | 0.29 | 0.004 | 0.59 | 2.0 | 50.000 |
| 2.5 | 5 | 0.29 | 0.002 | 0.29 | 1.0 | 100.000 |
| 2.6 | 5 | 0.29 | 0.0008 | 0.12 | 0.4 | 250.000 |

TABLE 2.1

| t [min] | Mn | Mw | PDI | $M_W^n$ |
|---|---|---|---|---|
| 0 | 90.876 | 315.268 | 3.5 | 1 |
| 30 | 79.138 | 249.987 | 3.2 | 0.79 |
| 60 | 71.931 | 206.205 | 2.9 | 0.65 |
| 120 | 58.057 | 148.123 | 2.6 | 0.47 |
| 240 | 57.165 | 144.855 | 2.5 | 0.46 |

TABLE 2.2

| t [min] | Mn | Mw | PDI | $M_W^n$ |
|---|---|---|---|---|
| 0 | 91.644 | 301.850 | 3.3 | 1 |
| 30 | 85.329 | 261.504 | 3.1 | 0.87 |
| 60 | 75.606 | 217.827 | 2.9 | 0.72 |
| 120 | 60.743 | 149.808 | 2.5 | 0.50 |
| 240 | 43.381 | 94.999 | 2.2 | 0.31 |

TABLE 2.3

| t [min] | Mn | Mw | PDI | $M_W^n$ |
|---|---|---|---|---|
| 0 | 88.404 | 300.869 | 3.4 | 1 |
| 30 | 81.515 | 268.850 | 3.3 | 0.89 |
| 60 | 75.145 | 231.994 | 3.1 | 0.77 |
| 120 | 62.300 | 164.555 | 2.6 | 0.55 |
| 240 | 46.016 | 106.782 | 2.3 | 0.35 |

TABLE 2.4

| t [min] | Mn | Mw | PDI | $M_W^n$ |
|---|---|---|---|---|
| 0 | 90.836 | 310.781 | 3.4 | 1 |
| 30 | 82.139 | 257.614 | 3.1 | 0.83 |
| 60 | 74.669 | 217.474 | 2.9 | 0.70 |
| 240 | 49.297 | 113.840 | 2.3 | 0.37 |

TABLE 2.5

| t [min] | Mn | Mw | PDI | $M_W^n$ |
|---|---|---|---|---|
| 0 | 87.895 | 301.258 | 3.4 | 1 |
| 30 | 79.458 | 254.116 | 3.2 | 0.84 |
| 60 | 74.752 | 223.595 | 3 | 0.74 |
| 120 | 63.386 | 171.361 | 2.7 | 0.57 |
| 240 | 49.062 | 118.342 | 2.4 | 0.39 |

TABLE 2.6

| t [min] | Mn | Mw | PDI | $M_W^n$ |
|---|---|---|---|---|
| 0 | 89.327 | 305.546 | 3.4 | 1 |
| 30 | 85.725 | 280.547 | 3.3 | 0.92 |
| 60 | 82.933 | 261.929 | 3.2 | 0.86 |
| 120 | 75.399 | 218.833 | 2.9 | 0.72 |
| 240 | 66.269 | 176.212 | 2.7 | 0.58 |

The greater the amount of added Vulkanox® BKF the faster the degradation of the molecular weight of the nitrile rubber.

Metathesis of NBR with Addition of Different Phenolic Compounds

In a 250 mL Schlenk flask fitted with a reflux cooler and a magnetic stirrer 5 g of the NBR purified according to protocol 2 and dried were dissolved in 45 g of MCB and admixed with the relevant phenolic compound. The respective phenolic compounds and the amounts added in each case are shown in table 3 which follows. The amounts of phenolic compound were chosen such that the number of OH groups is constant. The thus-obtained solution was degassed and inertized with argon. 8 phr of 1-dodecene and 0.5 ml of the fresh catalyst solution (corresponding to 0.005 phr of Grubbs II catalyst) were added countercurrently. The reaction mixture was stirred for 4 hours. Respective 2 mL samples were removed after reaction times of 30, 60, 120 and 240 minutes and, in a screw top vial, reacted with 0.5 mL of ethyl ether to terminate the metathesis reaction. The samples were analyzed by GPC.

TABLE 3

Metathesis of NBR with Grubbs II catalyst and different phenolic compounds

| No. | NBR [g] | Grubbs II [μmol] | Phenolic compound Designation | [phr] | [μmol] |
|---|---|---|---|---|---|
| 3.0 | 5 | 0.29 | — | — | — |
| 3.1 | 5 | 0.29 | Vulkanox ® BKF | 0.11 | 16 |
| 3.2 | 5 | 0.29 | Vulkanox ® BHT | 0.142 | 32 |
| 3.3 | 5 | 0.29 | Irganox ® 1076 | 0.343 | 32 |
| 3.4 | 5 | 0.29 | Irganox ® 1520 | 0.274 | 32 |
| 3.5 | 5 | 0.29 | Naugawhite ® | 0.155 | 16 |
| 3.6 | 5 | 0.29 | Phenol | 0.061 | 32 |
| 3.7 | 5 | 0.29 | 2,2' Bisphenol | 0.0602 | 16 |
| 3.8 | 5 | 0.29 | Bisphenol F | 0.0646 | 16 |

TABLE 3.0

Without phenolic compound

| t [min] | Mn | Mw | PDI | $M_W^n$ |
|---|---|---|---|---|
| 0 | 78.818 | 267.888 | 3.4 | 1 |
| 30 | 78.607 | 247.155 | 3.4 | 0.92 |
| 60 | 73.686 | 227.829 | 3.1 | 0.85 |
| 120 | 69.850 | 201.274 | 2.9 | 0.75 |

TABLE 3.1

Vulkanox ® BKF

| t [min] | Mn | Mw | PDI | $M_W^n$ |
|---|---|---|---|---|
| 0 | 78.818 | 267.888 | 3.4 | 1 |
| 30 | 71.530 | 244.566 | 3.4 | 0.91 |
| 60 | 69.991 | 225.212 | 3.2 | 0.84 |

TABLE 3.1-continued

Vulkanox ® BKF

| t [min] | Mn | Mw | PDI | $M_W^n$ |
|---|---|---|---|---|
| 120 | 61.406 | 191.359 | 3.1 | 0.71 |
| 240 | 56.057 | 159.784 | 2.9 | 0.60 |

TABLE 3.2

Vulkanox ® BHT

| t [min] | Mn | Mw | PDI | $M_W^n$ |
|---|---|---|---|---|
| 0 | 78.818 | 267.888 | 3.4 | 1 |
| 30 | 73.382 | 244.437 | 3.3 | 0.91 |
| 60 | 72.518 | 232.662 | 3.2 | 0.87 |
| 120 | 62.455 | 191.222 | 3.1 | 0.71 |
| 240 | 58.324 | 159.205 | 2.7 | 0.59 |

TABLE 3.3

Irganox ® 1076

| t [min] | Mn | Mw | PDI | $M_W^n$ |
|---|---|---|---|---|
| 0 | 78.818 | 267.888 | 3.4 | 1 |
| 30 | 76.617 | 246.289 | 3.2 | 0.92 |
| 60 | 72.299 | 226.869 | 3.1 | 0.85 |
| 120 | 68.890 | 199.815 | 2.9 | 0.75 |
| 240 | 64.542 | 171.813 | 2.7 | 0.64 |

TABLE 3.4

Irganox ® 1520

| t [min] | Mn | Mw | PDI | $M_W^n$ |
|---|---|---|---|---|
| 0 | 78.818 | 267.888 | 3.4 | 1 |
| 30 | 77.703 | 244.076 | 3.1 | 0.91 |
| 60 | 74.625 | 226.538 | 3.1 | 0.85 |
| 120 | 70.874 | 201.090 | 2.9 | 0.75 |
| 240 | 64.878 | 177.213 | 2.7 | 0.66 |
| 240 | 64.985 | 175.507 | 2.7 | 0.66 |

TABLE 3.5

Naugawhite ®

| t [min] | Mn | Mw | PDI | $M_W^n$ |
|---|---|---|---|---|
| 0 | 78.818 | 267.888 | 3.4 | 1 |
| 30 | 72.459 | 245.433 | 3.4 | 0.92 |
| 60 | 72.238 | 224.834 | 3.1 | 0.84 |
| 120 | 62.679 | 187.436 | 3 | 0.70 |
| 240 | 55.243 | 151.250 | 2.7 | 0.56 |

TABLE 3.6

Phenol

| t [min] | Mn | Mw | PDI | Mw$^n$ |
|---|---|---|---|---|
| 0 | 90.524 | 336.434 | 3.7 | 1 |
| 30 | 85.358 | 274.194 | 3.2 | 0.82 |
| 60 | 85.757 | 270.488 | 3.2 | 0.80 |
| 120 | 83.796 | 263.796 | 3.1 | 0.78 |
| 240 | 82.463 | 260.463 | 3.2 | 0.77 |

TABLE 3.7

2,2-Bisphenol

| t [min] | Mn | Mw | PDI | Mw$^n$ |
|---|---|---|---|---|
| 0 | 90.524 | 336.434 | 3.7 | 1 |
| 30 | 86.726 | 287.247 | 3.3 | 0.85 |
| 60 | 86.414 | 280.528 | 3.2 | 0.83 |
| 120 | 83.430 | 269.865 | 3.2 | 0.80 |
| 240 | 82.623 | 261.362 | 3.2 | 0.78 |

TABLE 3.8

Bisphenol F

| t [min] | Mn | Mw | PDI | Mw$^n$ |
|---|---|---|---|---|
| 0 | 90.524 | 336.434 | 3.7 | 1 |
| 30 | 87.143 | 290.594 | 3.3 | 0.86 |
| 60 | 87.831 | 286.988 | 3.3 | 0.85 |
| 120 | 85.923 | 281.070 | 3.3 | 0.84 |
| 240 | 87.143 | 279.175 | 3.2 | 0.83 |

Metathesis of NBR with Different Metathesis Catalysts and Addition of Naugawhite®

In a 250 mL Schlenk flask fitted with a reflux cooler and a magnetic stirrer 5 g of the NBR purified according to protocol 2 and dried were dissolved in 45 g of MCB and admixed with 0.155 phr of Naugawhite®. The thus-obtained solution was degassed and inertized with argon. 8 Phr of 1-dodecene and the relevant amount of the fresh catalyst solution were added countercurrently. The different catalysts and the employed amounts thereof are shown in table 4 below. The reaction mixture was stirred for 4 hours. Respective 2 mL samples were removed after reaction times of 30, 60, 120 and 240 minutes and, in a screw top vial, reacted with 0.5 mL of ethyl ether to terminate the metathesis reaction. The samples were analyzed by GPC.

TABLE 4

Metathesis of NBR with different metathesis catalysts and identical amount of phenolic compound (Naugawhite ®)

| No. | NBR [g] | Metathesis catalyst | | [phr] | [μmol] | Naugawhite ® [phr] | [μmol] |
|---|---|---|---|---|---|---|---|
| 4.1 | 5 | Grubbs II | | 0.0052 | 29 | 0.155 | 16 |
| 4.2 | 5 | Grubbs III | | 0.0052 | 29 | 0.155 | 16 |
| 4.3 | 5 | Grubbs-Hoveyda II | | 0.0037 | 29 | 0.155 | 16 |
| 4.4 | 5 | Grela | | 0.0039 | 29 | 0.155 | 16 |
| 4.5 | 5 | Fluorenylidene K2 | | 0.0053 | 29 | 0.155 | 16 |

TABLE 4.1

Grubbs II

| t [min] | Mn | Mw | PDI | $M_W^n$ |
|---|---|---|---|---|
| 0 | 82.309 | 300.137 | 3.6 | 1 |
| 30 | 77.355 | 271.178 | 3.5 | 0.90 |
| 60 | 69.650 | 230.549 | 3.3 | 0.77 |
| 120 | 60.680 | 172.187 | 2.8 | 0.57 |
| 240 | 43.337 | 111.555 | 2.6 | 0.37 |

TABLE 4.2

Grubbs III

| t [min] | Mn | Mw | PDI | $M_W^n$ |
|---|---|---|---|---|
| 0 | 82.309 | 300.137 | 3.6 | 1 |
| 30 | 64.954 | 204.445 | 3.1 | 0.68 |
| 60 | 56.704 | 166.005 | 2.9 | 0.55 |
| 120 | 53.082 | 141.737 | 2.7 | 0.47 |
| 240 | 48.281 | 128.343 | 2.7 | 0.43 |

TABLE 4.3

7.2 Grubbs-Hoveyda II

| t [min] | Mn | Mw | PDI | $M_W^n$ |
|---|---|---|---|---|
| 0 | 82.309 | 300.137 | 3.6 | 1 |
| 30 | 48.812 | 126.433 | 2.6 | 0.42 |
| 60 | 35.568 | 86.390 | 2.4 | 0.29 |
| 120 | 29.933 | 70.143 | 2.3 | 0.23 |
| 240 | 26.301 | 61.285 | 2.3 | 0.20 |

TABLE 4.4

Grela catalyst

| t [min] | Mn | Mw | PDI | $M_W^n$ |
|---|---|---|---|---|
| 0 | 82.309 | 300.137 | 3.6 | 1 |
| 30 | 41.123 | 91.334 | 2.2 | 0.30 |
| 60 | 33.990 | 71.893 | 2.1 | 0.24 |
| 120 | 31.449 | 65.135 | 2.1 | 0.22 |
| 240 | 29.823 | 61.087 | 2 | 0.20 |

TABLE 4.5

Fluorenylidene K2

| t [min] | Mn | Mw | PDI | $M_W^n$ |
|---|---|---|---|---|
| 0 | 90.907 | 303.323 | 3.3 | 1 |
| 30 | 57.990 | 146.410 | 2.5 | 0.48 |
| 60 | 44.057 | 98.707 | 2.2 | 0.33 |
| 120 | 35.083 | 74.144 | 2.1 | 0.24 |
| 240 | 30.509 | 62.826 | 2.1 | 0.21 |

The tested metathesis catalysts Grubbs II, Grubbs III, Grubbs-Hoveyda II, Grela and Fluorenylidene K2 show metathesis activity in the presence of 0.155 phr of phenolic compound (Naugawhite®). The metathesis catalysts Grubbs-Hoveyda II, Grela and Fluorenylidene K2 exhibit the strongest degradation of molecular weight in the shortest time.

The invention claimed is:

1. A catalyst system for reducing the molecular weight of nitrile rubbers by subjecting the nitrile rubber to a metathesis reaction, the catalyst system containing:
   (i) a metathesis catalyst containing at least one NHC ligand selected from the group consisting of:
   a catalyst of general formula (A),

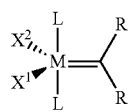

(A)

wherein
M represents osmium or ruthenium,
X1 and X2 are identical or different and represent halogen,
L represents identical or different ligands, wherein at least one ligand L represents an N-heterocyclic carbene ligand,
R are identical or different and represent hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulfonyl, or alkylsulfinyl, wherein all of these radicals may each optionally be substituted by one or more alkyl, halogen, alkoxy, aryl or heteroaryl radicals, or alternatively the two R radicals together with the common carbon atom to which they are bonded are bridged to form a cyclic group which may be aliphatic or aromatic in nature, is optionally substituted and may contain one or more heteroatoms;

a catalyst of general formula (B),

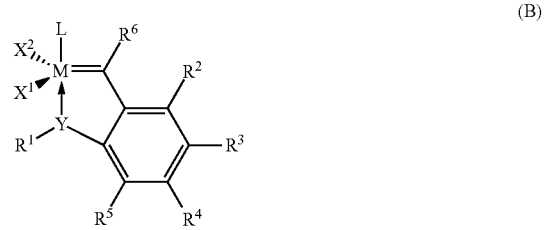

(B)

wherein
M represents ruthenium or osmium,
$X^1$ and $X^2$ are identical or different and represent halogen,
Y represents oxygen (O), sulfur (S), an N—$R^1$ radical or a P—$R^1$ radical, wherein
$R^1$ represents an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, each of which may optionally be substituted by one or more alkyl, halogen, alkoxy, aryl or heteroaryl radicals,
$R^2$, $R^3$, $R^4$ and $R^5$ are identical or different and represent hydrogen, organic or inorganic radicals,
$R^6$ is hydrogen or an alkyl, alkenyl, alkynyl or aryl radical and
L is a ligand as defined for the formula (A);
and
   (ii), as a co-activator,
at least one phenolic compound of general formula (Z2)

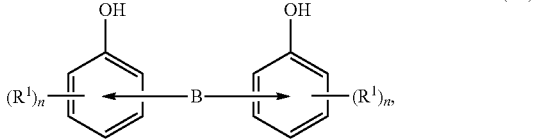

(Z2)

wherein
n has a value of 2, 3, or 4 and
R1 each independently represents $(C_1-C_{18})$-alkyl, $(C_3-C_{18})$-cycloalkyl, $(C_6-C_{10})$-aryl, $(C_6-C_{24})$-alkaryl, $(C_6-C_{24})$-aralkyl, —$N(R^2)_2$ where $R^2$ is H or $(C_1-C_{18})$-alkyl, —$NO_2$, $(C_1-C_{18})$-alkoxy, —CHO, —CN, $(C_3-C_{10})$-heteroaryl, —COO($R^2$) where $R^2$ is H or $(C_1-C_{18})$-alkyl, —CO—O—CO($R^2$) where $R^2$ is H or $(C_1-C_{18})$-alkyl, —$(CH_2)_n$—COO—$(CH_2)_n$—H, wherein n are each independently 1 to 18, —COX where X is Cl or Br, —CON(R²)₂ where R² is H or (C₁-C₁₈)-alkyl, or a halogen and B represents an alkanediyl group.

2. The catalyst system of claim 1, wherein the metathesis catalyst is selected from the group consisting of:
dichloro(fluorenylidene)(1,3-dimesityldihydroimidazolylidene)(triphenylphosphino)ruthenium,
1,3-bis(2,4,6-trimethylphenyl)-2-imidazolidinylidene)dichloro(o-isopropoxyphenylmethylene)ruthenium,
[1,3-bis(2,4,6-trimethylphenyl)-2-imidazolidinylidene] dichloro(phenylmethylene)bis(3-bromopyridine)ruthenium(II), and
1,3-bis(2,4,6-trimethylphenyl)-2-imidazolidinylidene)(2-isopropoxy-5-nitrobenzylidene)ruthenium(II)chloride.

3. The catalyst system of claim 1 wherein the phenolic compound of general formula (Z1) is selected from the group consisting of:
2,2'-methylene-bis(4-methyl-6-tert-butylphenol), and
2,2'-methylenebis(4-methyl-6-nonylphenol).

4. The catalyst system of claim 1, wherein the molar ratio of metathesis catalyst to phenolic compound of general formula (Z2)=1:(0.01-1000).

5. A process of performing a metathesis of nitrile rubber, the process comprising the use of the catalyst system of claim 1.

6. A process of reducing the molecular weight of nitrile rubbers, in which a nitrile rubber is subjected to a metathesis reaction in the presence of the catalyst system of claim 1 and wherein the process is carried out in a reaction mixture comprising the catalyst system and the nitrile rubber.

7. The process of claim 6, wherein the amount of metathesis catalyst is 1 to 1000 ppm of noble metal, based on the nitrile rubber subjected to the metathesis reaction.

8. The process of claim 6, wherein the amount of phenolic compound of general formula (Z2) is 0.0001 phr to 5 phr, based on the nitrile rubber subjected to the metathesis reaction.

9. The process of claim 6, wherein the metathesis reaction is performed in the absence or in the presence of a co-olefin.

10. The process of claim 6, wherein the metathesis reaction is carried out in an organic solvent.

11. The process of claim 6, wherein the concentration of the nitrile rubber in the reaction mixture is in the range from 1% to 25% by weight, based on the reaction mixture.

12. The process according to claim 6, wherein the metathesis reaction is carried out at a temperature in the range from 10° C. to 150° C.

13. A nitrile rubber formed by the process of claim 6, wherein the amount of phenolic compound according to formula (Z2) is 0.0001 phr to 5 phr, based on the total amount of nitrile rubber subjected to the metathesis reaction, wherein the nitrile rubber formed has a Mooney viscosity (ML 1+4 at 100° C.) from 5 to 35 Mooney units.

14. The nitrile rubber of claim 13, having a molecular weight Mw in the range of 10 000 g/mol to 100 000 g/mol.

15. The nitrile rubber of claim 13, having a polydispersity index (PDI=Mw/Mn) in the range of 1.4 to 4.0, wherein Mw is the weight-average molecular weight and Mn is the number-average molecular weight.

16. The catalyst system of claim 1, wherein the metathesis catalyst is selected from the group consisting of:
dichloro(fluorenylidene)(1,3-dimesityldihydroimidazolylidene)(triphenylphosphino)ruthenium,
1,3-bis(2,4,6-trimethylphenyl)-2-imidazolidinylidene)dichloro(o-isopropoxyphenylmethylene)ruthenium,
[1,3-bis(2,4,6-trimethylphenyl)-2-imidazolidinylidene] dichloro(phenylmethylene)bis(3-bromopyridine)ruthenium(II), and,
1,3-bis(2,4,6-trimethylphenyl)-2-imidazolidinylidene)(2-isopropoxy-5-nitrobenzylidene)ruthenium(II)chloride; and
the phenolic compound of general formula is selected from the group consisting of:
2,2'-methylene-bis(4-methyl-6-tert-butylphenol), and
2,2'-methylenebis(4-methyl-6-nonylphenol).

* * * * *